US012383927B2

(12) United States Patent
Pope et al.

(10) Patent No.: US 12,383,927 B2
(45) Date of Patent: Aug. 12, 2025

(54) DEVICES AND METHODS FOR APPLYING A SUBSTANCE TO A SPORTS BALL

(71) Applicant: Chalkless LLC, Wilmington, MA (US)

(72) Inventors: David G. Pope, West Newbury, MA (US); James M. Pidhurney, Auburn, NH (US)

(73) Assignee: Chalkless LLC, Wilmington, MA (US)

( * ) Notice: Subject to any disclaimer, the term of this patent is extended or adjusted under 35 U.S.C. 154(b) by 445 days.

(21) Appl. No.: 17/932,710

(22) Filed: Sep. 16, 2022

(65) Prior Publication Data

US 2023/0001449 A1 Jan. 5, 2023

Related U.S. Application Data

(63) Continuation-in-part of application No. 17/810,356, filed on Jul. 1, 2022, now Pat. No. 11,660,257, and a continuation-in-part of application No. PCT/US2022/073334, filed on Jul. 1, 2022.

(60) Provisional application No. 63/264,674, filed on Nov. 30, 2021, provisional application No. 63/263,484, filed on Nov. 3, 2021, provisional application No. 63/262,654, filed on Oct. 18, 2021, provisional application No. 63/262,117, filed on Oct. 5, 2021, (Continued)

(51) Int. Cl.

| | |
|---|---|
| ***B05D 5/02*** | (2006.01) |
| ***A63B 45/00*** | (2006.01) |
| ***A63B 47/00*** | (2006.01) |
| ***B05D 3/12*** | (2006.01) |
| *A63B 102/18* | (2015.01) |

(52) U.S. Cl.

CPC ................ *B05D 5/02* (2013.01); *A63B 45/00* (2013.01); *A63B 47/008* (2013.01); *B05D 3/12* (2013.01); *A63B 2102/18* (2015.10)

(58) Field of Classification Search

CPC ... B05D 5/02; B05D 3/12; B05D 1/22; B05D 2518/10; B05D 2601/22; B05D 2258/00; A63B 37/0022; A63B 60/004; A63B 45/00; A63B 47/008

See application file for complete search history.

(56) References Cited

U.S. PATENT DOCUMENTS

| | | | | | |
|---|---|---|---|---|---|
| 4,877,655 | A * | 10/1989 | Rockerath | B05D 1/18 | 118/421 |
| 5,040,795 | A * | 8/1991 | Sonntag | C09D 7/61 | 473/596 |

(Continued)

FOREIGN PATENT DOCUMENTS

CN 212235883 U * 12/2020

OTHER PUBLICATIONS

Webcapture of https://tht.fangraphs.com/get-a-grip/ "Get a grip" by Stephanie Springer Oct. 25, 2017 (Year: 2017).*

(Continued)

*Primary Examiner* — Nathan H Empie

(74) *Attorney, Agent, or Firm* — Talus Law Group LLC

(57) ABSTRACT

The present invention surrounds the application of a substance to a sports ball, such as silica silylate, for the purposes of increasing grip and hydrophobicity. Disclosed are inventions surrounding the method, the system, and the apparatus for the treatment of a sports ball or other objects which a user desires to treat with a substance to achieve certain results in relation to the substance applied.

20 Claims, 16 Drawing Sheets

Related U.S. Application Data provisional application No. 63/245,742, filed on Sep. 17, 2021, provisional application No. 63/217,686, filed on Jul. 1, 2021.

(56) References Cited

U.S. PATENT DOCUMENTS

| | | | | |
|---|---|---|---|---|
| 5,204,088 | A * | 4/1993 | Noebel | B82Y 5/00 424/47 |
| 6,217,464 | B1 * | 4/2001 | Chang | A63B 37/0003 473/378 |

OTHER PUBLICATIONS

Rogue Fitness Gym Chalk—Magnesium Carbonate.
Lena Blackburne Rubbing Mud for baseballs.
International Search Report and Written Opinion in PCT/US22/76538.

* cited by examiner

DEVICES AND METHODS FOR APPLYING A SUBSTANCE TO A SPORTS BALL

CROSS REFERENCE TO RELATED APPLICATIONS

This application claims the benefit of U.S. Provisional Patent Application 63/245,742 entitled "Systems And Methods For Applying Particulate Material To Solid Surfaces, Such As Surfaces Of Balls, And Related Articles" filed on Sep. 17, 2021; U.S. Provisional Patent Application No. 63/262,117 entitled "Devices And Methods For Uniform Application Of Aerogel To Sports Balls" Filed on Oct. 5, 2021; U.S. Provisional Patent Application No. 63/262,654 entitled "Devices And Methods For Uniform Application Of Aerogel To Sports Balls" filed Oct. 18, 2021; U.S. Provisional Patent Application No. 63/263,484 entitled "Devices And Methods For Uniform Application Of A Substance To A Sports Ball" filed Nov. 3, 2021; and U.S. Provisional Patent Application No. 63/264,674 entitled "Devices And Methods For Uniform Application Of Aerogel To A Sports Ball" filed Nov. 30, 2021. Furthermore, this application is a continuation-in-part of U.S. patent application Ser. No. 17/810,356 entitled "Particulate Aerogel Material For Grip Enhancement" filed on Jul. 1, 2022, which claims the benefit of U.S. Provisional Application No. 63/217,686 entitled "Particulate Aerogel Material For Grip Enhancement" filed Jul. 1, 2021. Further still, this application is a continuation-in-part of PCT Application No. PCT/US22/73334 filed Jul. 1, 2022, which claims the benefit of U.S. Provisional Application No. 63/217,686 entitled "Particulate Aerogel Material For Grip Enhancement" filed Jul. 1, 2021. The entire contents of the foregoing applications are incorporated herein by reference in their entirety for all purposes.

FIELD OF THE INVENTION

The present invention is directed to systems, devices, and methods for the application of a substance to a sports ball, such as silica silylate, wherein the application of the substance is intended to augment the characteristics of the sports ball, including increased grip and hydrophobicity.

BACKGROUND OF THE INVENTION

Silica silylate, a siloxane polymer, has been used in certain forms for characteristics which provide insulative properties. In other applications, silica silylate has been included into cosmetics for properties including emollient, binder, thickening agent, and can also help prevent foam formation. Silica silylate is typically characterized as being synthetic, hydrophobic, and thixotropic compound that is commonly used as a thickening agent. As recognized in U.S. patent application Ser. No. 17/810,356, the external surface characteristics of a sports ball may be augmented or enhanced by the application of silica silylate.

The ability to apply a compound such as silica silylate to an external surface of a sports ball provides its own challenges. The application of a coating to a ball, especially when used by professional teams, requires repeatability and consistency. For instance, it is approximated that 900 thousand baseballs are used by Major League Baseball per year—30 thousand per team. Of the 900 thousand baseballs used by Major League Baseball per year, 200 thousand are used for games at a rate of 80-120 balls per game. Major league players and other stakeholders require consistency in a sports ball to maintain consistency in performance. And while players of a sport do not require the same consistency of product expected by professional level sports such as in Major League Baseball, they may prefer to play the sport with the same quality product as played by the highest level of their sport. Thus, there is a current need for devices and methods for the consistent and repeatable application of silica silylate, or other siloxane polymers, to the external surface of a sports ball.

SUMMARY OF THE INVENTION

The application of silica silylate to an exterior surface of a sports ball involves a number of steps dependent upon the level of consistency and repeatability desired. Although the present invention surrounds the application of silica silylate to the exterior of a sports ball, the use of an alternate siloxane polymer or other hydrophobic or oleophilic particles, or the application of such compounds to alternate surfaces not discussed herein for similar benefit are within the spirit and scope of the present invention.

It is an aspect of certain embodiments of the present invention to provide methods, devices, and systems for the surface treatment of sports balls with silica silylate wherein the surface treatment resulting in surface characteristics which are substantially homogeneous around the entirety of the surface of the individual sports ball. Furthermore, it is an aspect of certain embodiments presented herein that the surface characteristics of a plurality of sports balls comprise substantially homogenous surface characteristics following surface treatment wherein the surface treatment of each ball is essentially identical and repeatable within a prescribed margin of error based on physical property testing protocols.

It is an aspect of certain embodiments of the present invention to monitor the surface treatment process of a singular sports ball or a plurality of sports balls being treated in a batch quantity to ensure that each sports ball receives the same surface treatment with relation to consumable or reusable media. Such media refers to, but is not limited to, silica silylate, abrasive media (such as plastic beads or ceramic rods), and distributing media used for even distribution of silica silylate.

It is an aspect of the present invention to provide a method for providing silica silylate surface treatment for individual sports balls intended for mass manufacture and delivery to individual users. Certain embodiments, well-suited for mass manufacture and delivery to everyday consumers, involve a user applied method wherein the user is provided with a predetermined amount of granulized or powdered silica silylate with instructions as to how to apply the silica silylate to the surface of the sports ball. Certain embodiments provide an applicator such as a glove or swatch of cloth having specific characteristic suited for applying and/or removing silica silylate, while other embodiments provide a method of agitating the ball to ensure a more homogenous and consistent application of the silica silylate to the exterior surface of the ball. Certain embodiments, also well suited for use by everyday consumers, involves the use of a container in which a sports ball is placed with a predetermined amount of silica silylate prior to sealing, wherein the user agitates the container with the sports ball therein to apply silica silylate to the external surface of the sports ball. Such embodiments which comprise a sealed container for agitation are reusable for reapplication of the silica silylate after a period of time or use wherein the benefits of the surface treatment of the silica silylate have diminished.

In is an aspect of further embodiments of the present invention to provide surface treatment methods, systems, and devices for treating the surface of multiple sports balls at a time with silica silylate. Certain embodiments of the present invention comprise methods, systems, and devices configured for a semi-automated process in which the sports balls are placed individually or in a batch into equipment which provides the silica silylate and agitating action. The agitation can be provided through use of vibrational aspects or tumbling action of the equipment. While in certain embodiments the agitation can be accomplished with only silica silylate, alternate embodiments comprise a mixing media to increase surface treatment. Such mixing media promotes even coating through abrasion and mechanical deposition during the treatment process. Abrasion of certain embodiments is used for surface preparation, even coating of silica silylate, as well as eliminating buildup of silica silylate on portions of a sports ball such as on the stitching sports balls such as baseballs and footballs. Mixing media may also be used to force silica silylate particles into gaps in the surface of a sports ball, such as into the fibers of the laces of football or the stitching of a baseball, causing the laces/stitching to become harder and more pronounced. Such mixing media may also be used to decrease the cycle time needed to achieve a prescribed surface treatment level.

Thus, it is an aspect of certain embodiments to allow the treatment of sports balls used in differing environments in a manner that provides a consistent surface treatment result substantially agnostic to the ambient environment at the location of treatment. Certain embodiments of the present invention comprise methods, systems, and devices for the pre-process and post-process storage of sports balls after exterior surfaces have been treated with silica silylate. When stored pre-process or post-process, certain embodiments provide controls to the environment. Sports balls rested in a high humidity or high temperature environment after treatment with silica silylate may exhibit different post-process surface characteristics than when stored in a low temperature or low humidity environment. By providing a prescribed atmosphere in which the sports balls are processed, the resulting surface characteristics will not be affected or differ due to geographic location or ambient environmental differences.

In certain embodiments, silica silylate is used to treat the surface of sports balls in a sealed vessel wherein the sealed vessel allows for the adjustment and variation of pressure. In certain embodiments is it preferred to employ a negative pressure within a sealed vessel for the treatment of the exterior surface of the sports balls with silica silylate, while alternative embodiments it is preferred to employ a positive pressure within the sealed vessel for the treatment of the exterior surface of the sports balls with silica silylate.

It is an aspect of certain embodiments to treat the external surface of a sports ball with silica silylate while mitigating potential damage to the external surface of the sports ball. In certain embodiments, silica silylate is applied through a spraying process in which a silica silylate powder is aerosolized or sprayed in a treatment chamber in which a sports ball is passed through. In certain embodiments, the sports ball is pretreated with a compound prior to passing through the chamber to maximize the adhesion of the silylate powder to the sports ball when passing through the treatment chamber.

The use of silica silylate in a nanoparticle form, microparticle form, and/or fine particle form are within the spirit and scope of the present invention. Nanoparticles refer to particles of matter between about 1 and 100 nanometers in diameter, fine particles refer to particles of matter between about 100 and 2500 nanometers in diameter, and microparticles refer to particles of matter between about 1 and 1000 micrometers in diameter. In alternative embodiments, other forms of aerogel or other hydrophobic or oleophilic particles may be used with or in the place of silica silylate. References to silica silylate herein may also refer to such other forms of aerogel or other hydrophobic or oleophilic particles.

It is an aspect of the present invention to positively track the exterior surface treatment of a sports ball. The positive tracking of the treatment of sports ball provides an increased level of quality assurance. The positive tracking of the surface treatment of a sports ball ensures that steps are not skipped, and steps are not duplicated for each sports ball. Therefore, each sports ball undergoes an identical surface treatment process providing a higher level of quality assurance and quality standards ensuring a consistent final product.

It is an aspect of certain embodiments of the present invention to provide a consistent and repeatable product through the limitation of human interaction and human control of a system which is used for the surface treatment of a sports ball. In certain embodiments, a system for the surface treatment of a sports ball limits the human control wherein security protocols restrict the use of the system and the insertion of sports balls into the system. In certain embodiments security protocols restrict the removal of sports balls from the system such that only authorized personnel are permitted to access the sports balls post-process to mitigate tampering with the sports balls prior to use in play.

Silica silylate dust—particularly in finer powder form—reduces the reliability of mechanical systems. It is an aspect of certain embodiments of the present invention to provide proper dust collection and dust mitigation surrounding the treatment of sports balls with silica silylate.

It is an aspect of certain embodiments of the present invention to mitigate static charge levels which may prevent the bonding of silica silylate to sports balls or other objects being treated for surface augmentation with silica silylate. It may be desired in certain embodiments to employ methods including improved grounding, introduction of ionized air, increased moisture, increased localized humidity, and the introduction of polyethylene glycol. Polyethylene glycol is an antistatic agent based on a long-chain aliphatic amine. Alternate antistatic agents based on aliphatic amides and amides such as quaternary ammonium salts, esters of phosphoric acid, and polyols are within the spirit and scope of the present invention. Furthermore, alternate anti-static agents such as long-chain alkyl phenols, ethoxylated amines, and glycerol esters are within the spirit and scope of the present invention, or other agents having anti-static properties are within the spirit and scope of the present invention.

It is an aspect of the present invention to provide a method for treating sports balls in a manner that provides a desired level of hydrophobicity and tackiness for tactile feel. Testing of sports balls throughout the process surrounding variables such as hydrophobicity, surface roughness, tackiness, and other variables are within the spirit and scope of the present invention.

It is an aspect of certain embodiments of the present invention to treat sports balls through the agitation of the sports balls within a sealed container with silica silylate added therein. The agitation of the sports balls occurs at a rate fast enough to provide ample mixing without causing damage to the sports balls, and slow enough to prevent a lack of mixing due to centripetal forces.

The embodiments described herein surrounding a method for treatment of sports balls can be performed in a central location, or can be performed on-site by hand or with specialized equipment adapted for the treatment of a plurality of sports balls in a single process. Furthermore, the partial treatment of sports balls and delivery to a second location for final treatment is within the spirit and scope of the present invention.

These and other advantages will be apparent from the disclosure of the inventions contained herein. The above-described embodiments, objectives, and configurations are neither complete nor exhaustive. Other embodiments of the invention are possible using, alone or in combination, one or more of the features set forth above or described in detail below. Further, this summary is neither intended nor should it be construed as being representative of the full extent and scope of the present invention. The present invention is set forth in various levels of detail in this summary, as well as in the attached drawings and the detailed description below, and no limitation as to the scope of the present invention is intended to either the inclusion or non-inclusion of elements, components, etc. in this summary. Additional aspects of the present invention will become more readily apparent from the detailed description, particularly when taken together with the drawings, and the claims provided herein.

DETAILED DESCRIPTION OF VARIOUS EMBODIMENTS

Figure 1:
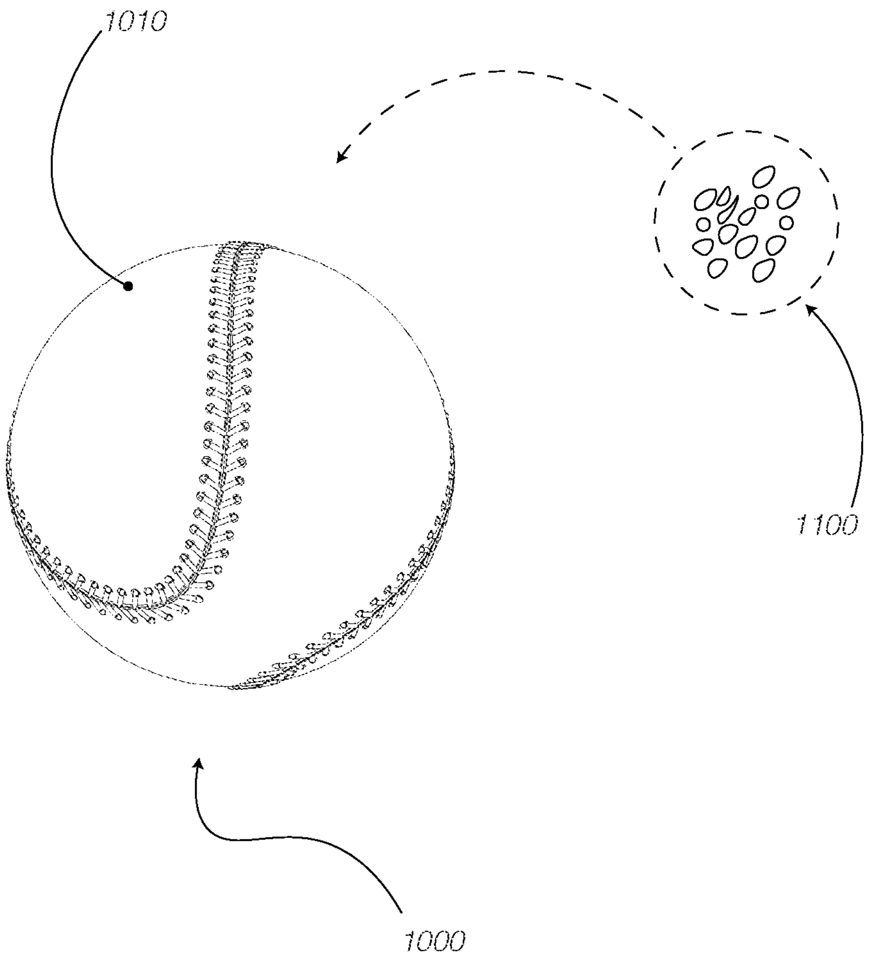
FIG. 1—A perspective view of certain embodiments of a system for the treatment of a sports ball with silica silylate FIG. 2—A perspective view of certain embodiments of a system for the treatment of a sports ball with silica silylate FIG. 3—A perspective view of certain embodiments of a system for the treatment of a sports ball with silica silylate FIG. 4A-A diagrammatic view of certain embodiments of a method for the treatment of a sports ball with silica silylate FIG. 4B-A diagrammatic view of certain embodiments of a method for the treatment of a sports ball with silica silylate FIG. 5—A diagrammatic view of certain embodiments of a system for the treatment of a sports ball with silica silylate FIG. 6—A diagrammatic view of certain embodiments of a system for the treatment of a sports ball with silica silylate FIG. 7—A diagrammatic view of certain embodiments of a method for calibration of a system for the treatment of a sports ball with silica silylate FIG. 8—A perspective view of certain embodiments of a system comprising an inspection station for inspecting the surface condition of a sports ball treated with silica silylate FIG. 9—A diagrammatic view of certain embodiments of a system for the treatment of a sports ball with silica silylate FIG. 10—A diagrammatic view of certain embodiments of a system for the treatment of a sports ball with silica silylate FIG. 11—A diagrammatic view of certain embodiments of a system for the treatment of a sports ball with silica silylate FIG. 12A-A perspective view of certain embodiments including comprising a receptacle for a sports ball including a transparent view of a sports ball FIG. 12B-A top view of certain embodiments comprising a receptacle for a sports ball FIG. 12C-A side view of certain embodiments including a receptacle for a sports ball FIG. 13—A diagrammatic view of certain embodiments of a system for the treatment of a sports ball with silica silylate FIG. 14A-A perspective exploded view of certain embodiments comprising a treatment chamber FIG. 14B-A perspective exploded view of certain embodiments comprising a treatment chamber FIG. 14C-A side exploded view of certain embodiments comprising a treatment chamber FIG. 14D-A section view of the treatment chamber as shown in FIG. 14C FIG. 14E-A top view of certain embodiments comprising a treatment chamber FIG. 14F-A detail view of the treatment chamber as shown in FIG. 14D

Certain embodiments of the present invention, for example as shown in FIG. 1, comprise a system for the treatment of a sports ball with silica silylate 1100, particularly the external surface 1010 of sports ball 1000. Embodiments disclosed herein surround the methods, systems and devices surrounding the application of silica silylate 1100 to the sports ball 1000.

Figure 2:
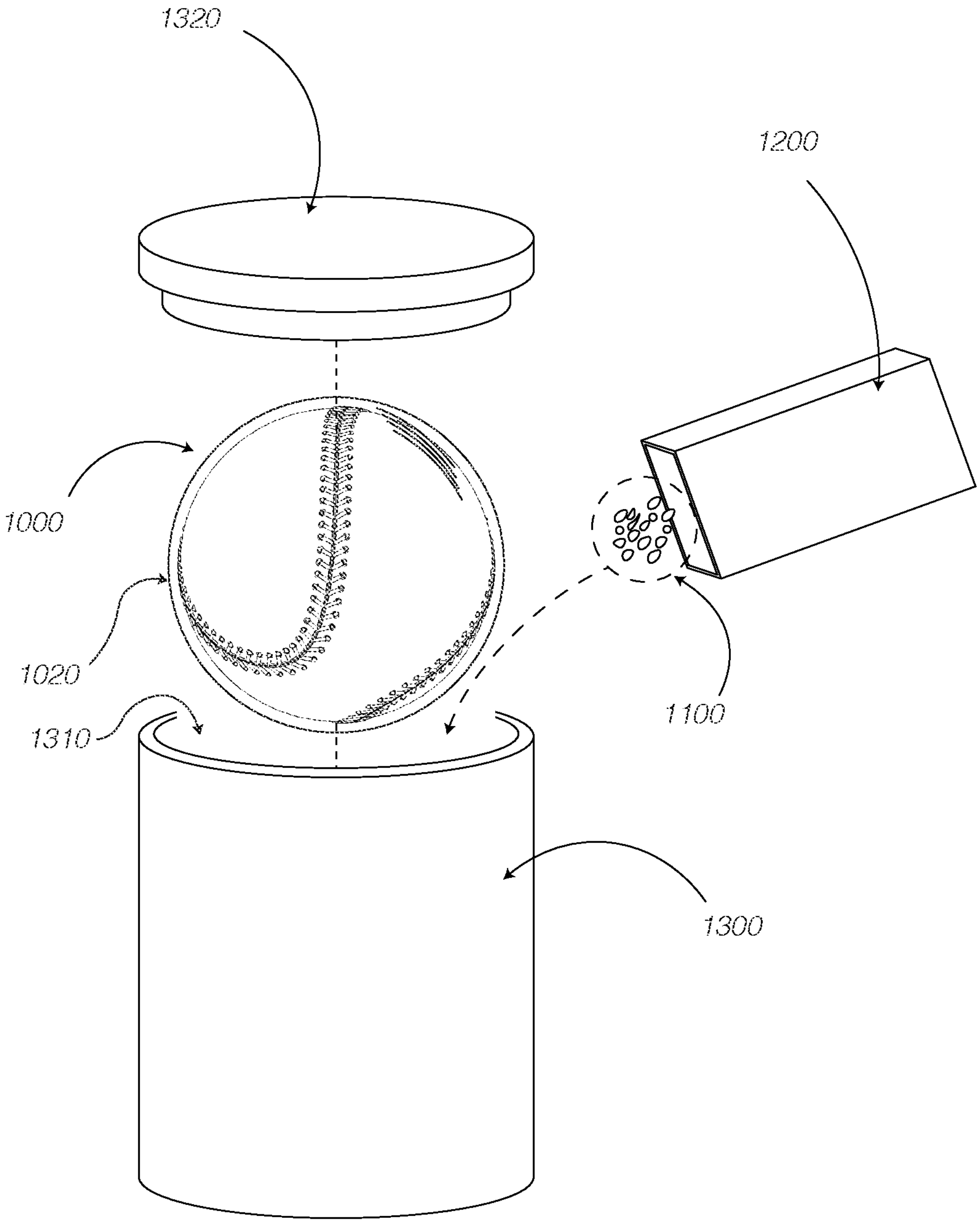

Certain embodiments of the present invention, for example as shown in FIG. 2, surround a system for applying silica silylate 1100 to a sports ball 1000, comprising a sealable container 1300 configured to receive a sports ball 1000. A packet 1200 containing a predetermined amount of silica silylate 1100 is provided with the system wherein the user deposits the silica silylate 1100 from the packet 1200 into an open aspect 1310 of the sealable container with the sports ball 1000 and reseals the sealable container 1300. In certain embodiments, the sealable container 1300 comprises a lid 1310 which the user places on an open aspect 1310 to seal the sealable container 1300 prior to agitating the system through shaking, vibration, or other method of mechanical agitation. Some embodiments of systems as disclosed herein comprise a sports ball 1000, while alternate embodiments of systems do not comprise a sports ball 1000 and are intended as treatment methods for sports balls 1000 obtained by a user outside of the proposed systems. A sealed container having rigid walls, semi-rigid walls, or flexible walls are within the spirit and scope of the present invention. In certain embodiments, the interior of the sealed container comprises ridges or other protrusions to maintain the sports ball 1000 at a pre-determined distance from the interior surface. Certain sealable containers, such as zipper sealed bags, are also within the spirit and scope of the present invention. In certain embodiments, the sealable container 1300 comprises a leather bag or pouch with a closure comprising a roll-top or zip-lock seal. These closures may be combined to contain silica silylate dust during surface treatment. The bag or pouch may be assembled with the smooth or rough side of the leather oriented towards the inside of the bag or pouch. In certain embodiments, the interior of the container comprises a rough surface. In other embodiments, the interior of the container comprises a smooth surface. For example, a leather bag or pouch could be constructed with a smooth leather interior or a rough leather interior.

In certain embodiments, referencing FIG. 2 once again, the sports ball 1000 is prepackaged in a wrapper 1020. The wrapper 1020 provides a vapor and chemical impermeable barrier for the sports ball. The use of a wrapper 1020 allows a sports ball manufacturer to pretreat or precondition the sports ball 1000 to predetermined environmental conditions predetermined to be preferable for the application of silica silylate 1100. The pretreating or preconditioning of a sports ball includes, but is not limited to, the establishing a temperature, humidity or internal moisture equilibrium, chemical treatment, surface conditioning with topical ointment, surface abrasion, surface polishing, and other methods of pretreating or preconditioning. In certain embodiments, the silica silylate 1100 is introduced into the wrapper before sealing so that, once sealed, movement of the packaging or container during handling or transportation applies the silica silylate 1100 to the ball surface. Instructions for further movement or manipulation of the packaging or container may be specified by writing on the packaging or container. In certain embodiments, a gas is introduced into the wrapper before sealing such as Helium, Neon, Argon, Krypton, Xenon, Nitrogen, Oganesson, or other inert or hydrophobic gas.

Figure 3:
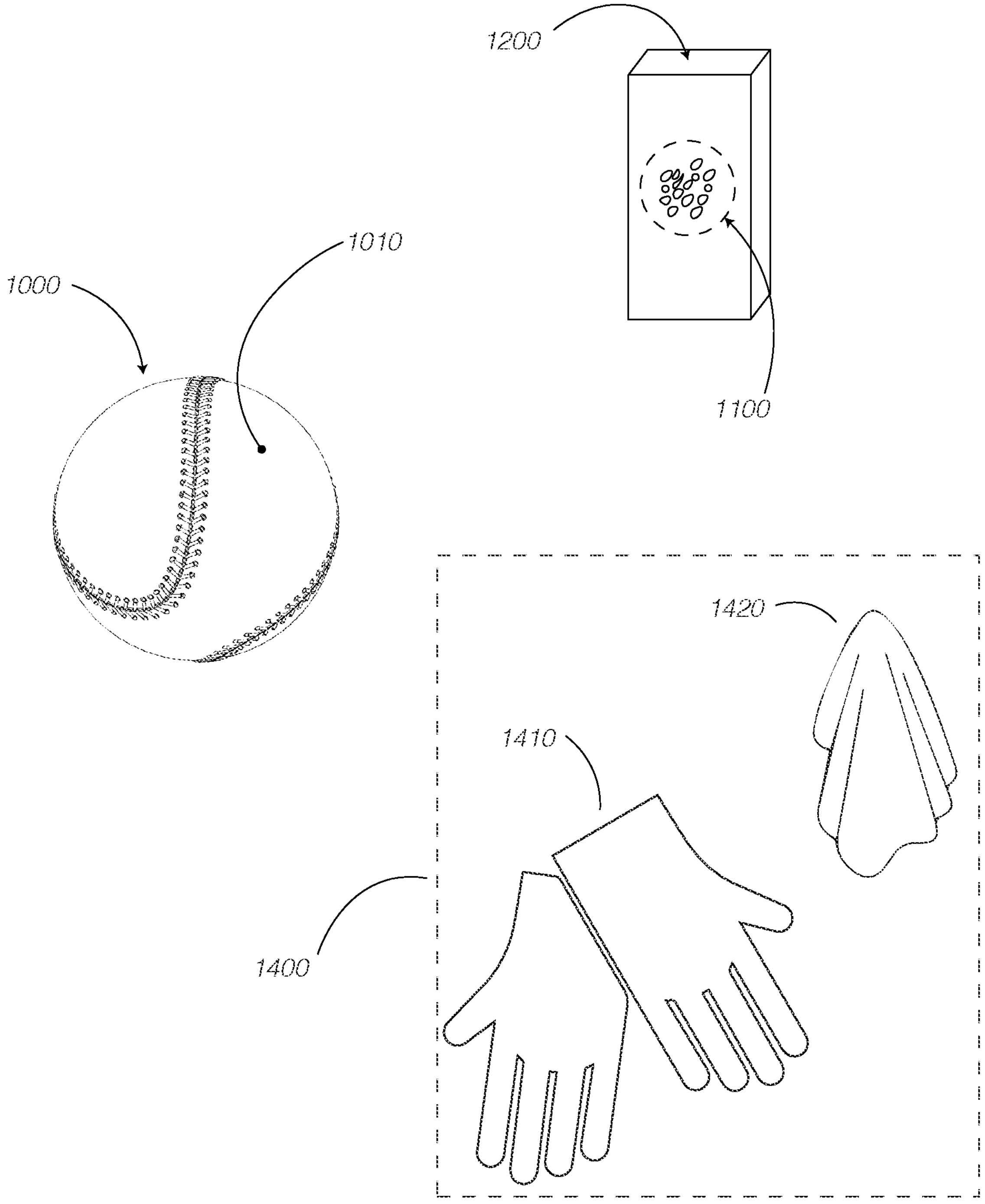

Certain embodiments of the present invention, such as shown in FIG. 3, comprise a system for applying silica silylate 1100 to a sports ball 1000, comprising a packet 1200 containing a predetermined amount of silica silylate 1100, and an applicator 1400. In certain embodiments, an applicator 1400 comprises an applicator glove or gloves 1410, while alternate embodiments comprise an applicator cloth 1420. The material of the applicator 1400 is formulated and configured for the application of silica silylate to a sports ball 1000.

In certain embodiments, referencing FIG. 3 again, an applicator 1400 is pre-impregnated with silica silylate wherein a user simply rubs the applicator on the external surface 1010 of the sports ball 1000 for at least a predetermined period of time. Although embodiments of the present invention surround the application of a dry powder or particulate form of silica silylate to sports balls, the application of silica silylate with a carrier media or carrier fluid is also within the spirit and scope of the present invention. For example, in certain embodiments, the carrier media or carrier fluid is included in packet 1200.

Figure 4A:
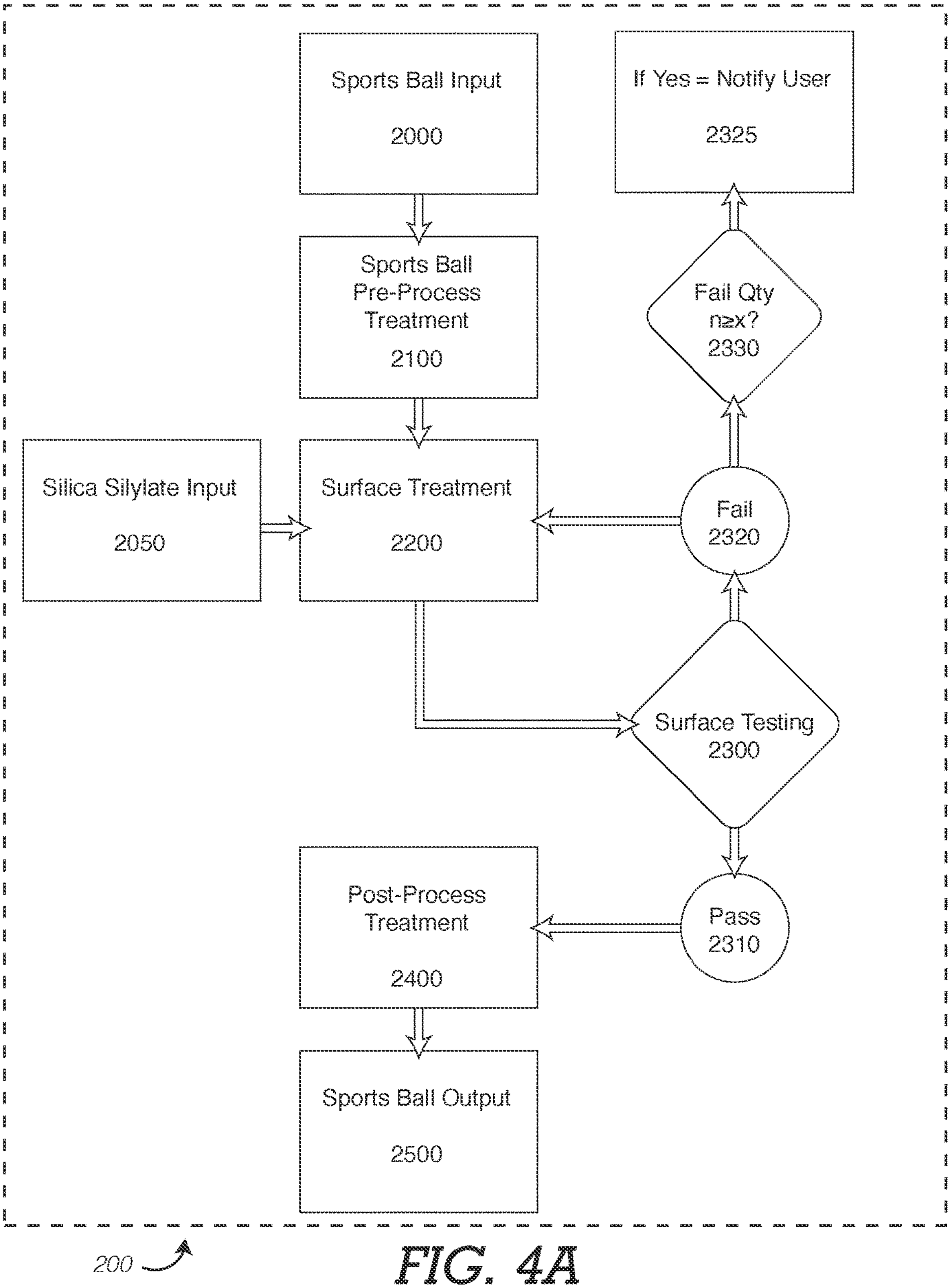
Figure 4B:
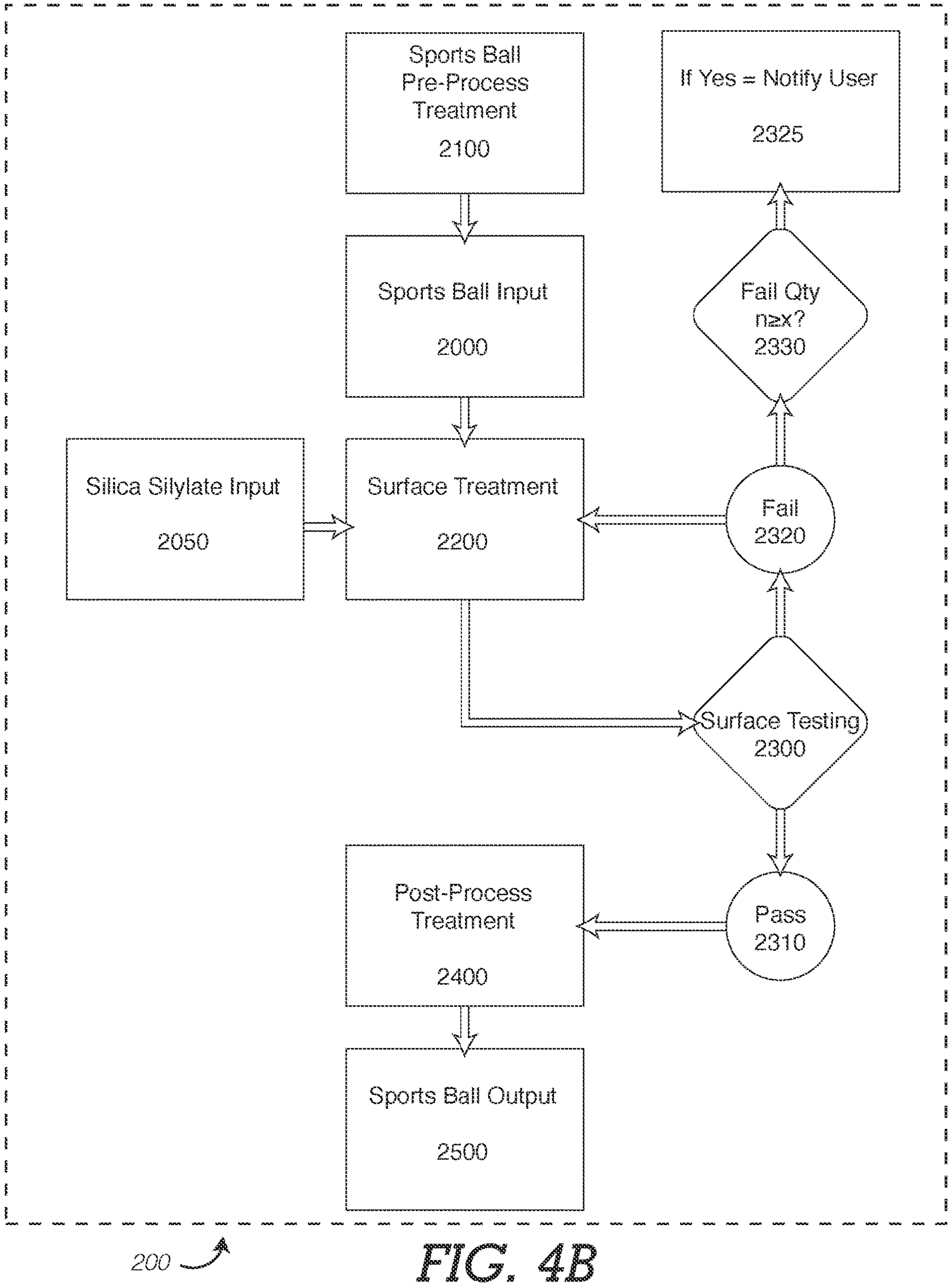
Figure 5:
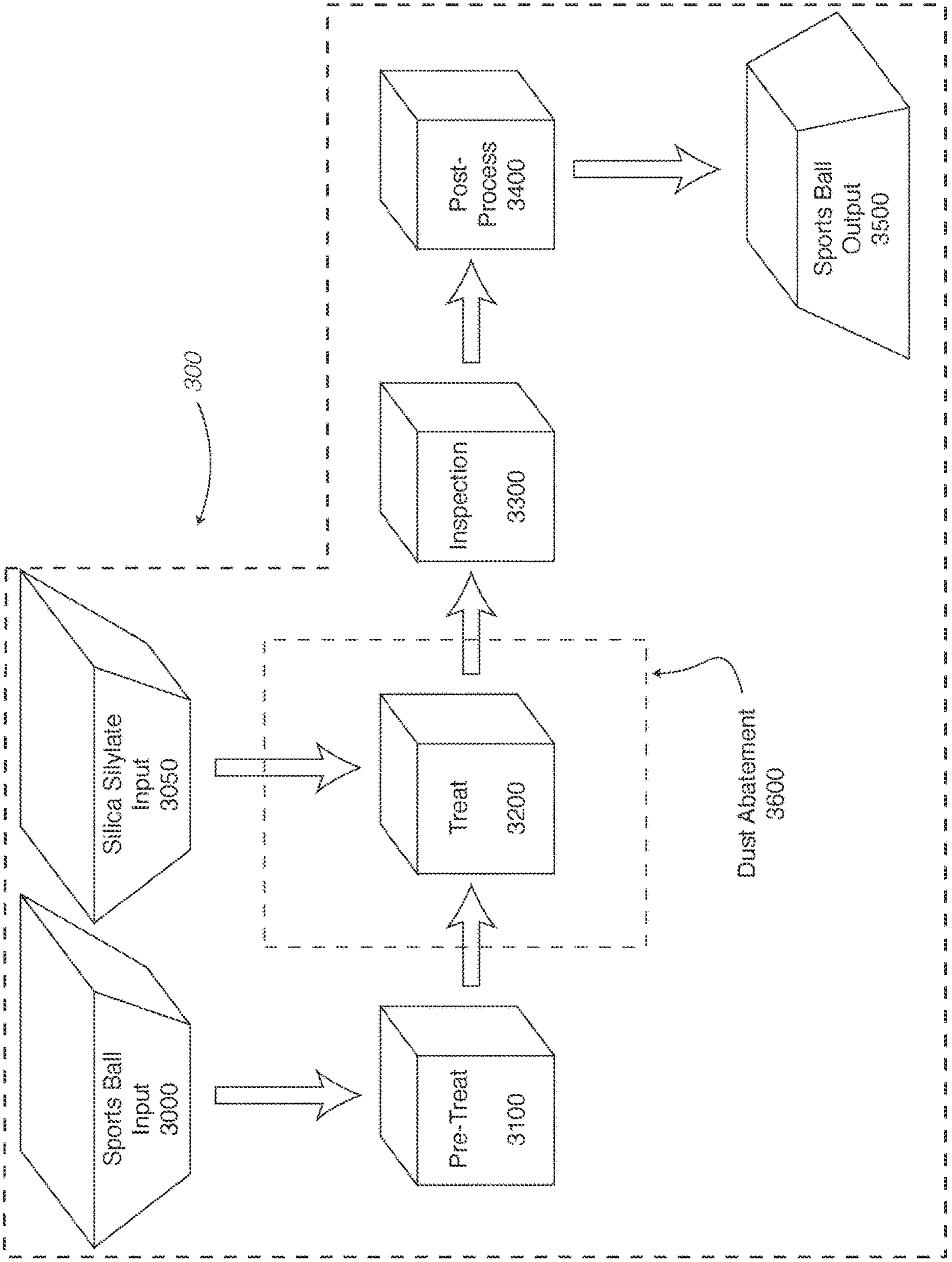

Certain embodiments, such as shown in FIG. 4A-FIG. 5, comprise a method for the treatment of sports balls wherein at least one step is performed by machinery or automated. A first step comprises inputting 2000 at least a first sports ball into a process in preparation for surface treatment with silica silylate. In certain embodiments at least a first sports ball is placed into a sports ball input 3000. The sports ball input 3000 of certain embodiments comprises a hopper configured to receive at least one or a plurality of sports balls. In certain embodiments an input is configured to receive a batch of about 5-10, 10-15, 15-30, 30-60, or 60-120 sports balls, while alternate embodiments are configured for the continuous deposit of sports balls therein. In certain embodiments a hopper is used in combination with a conveyor belt, such as found in U.S. Pat. No. 2,779,508 to Earl Ensinger—incorporated by reference herein for all purposes—to transfer sports balls from a hopper to a following step in the process of treatment of a sports ball with silica silylate. In certain embodiments the transition between steps in the method of treating a sports ball with silica silylate is physically accomplished with a conveyor belt. In certain embodiments a sports ball is transferred between steps using gravity wherein the sports ball falls or rolls between steps of the method. In certain embodiments, conveyor belts, channels, tracks, or pneumatically charged tubes are used to convey sports balls from one station of the system to another (e.g., from pre-treat 3100 to treat 3200).

Certain embodiments, such as shown in FIG. 4A-FIG. 5, comprise a method for the treatment of sports balls wherein a pre-process treatment 2100 is performed in a pretreat 3100 chamber wherein at least a first sports ball is prepared for surface treatment with silica silylate. In certain embodiments, the pre-process treatment comprises storing a sports ball in an environmentally controlled pretreat 3100 chamber wherein the environment is controlled to a predetermined set of variables. Environmental variables controlled within certain embodiments include, but are not limited to, humidity, pressure, and temperature. In certain embodiments, the pre-process treatment 2100 comprises applying a chemical, fluid, or powder to the surface of the sports in predetermined amounts or durations of time to prepare the surface of the sports ball for proper adhesion and coverage of the silica silylate in later processes. In certain embodiments the pre-process treatment comprises surface preparation of the sports ball wherein the sports ball surface is modified with abrasive or polishing media.

In certain embodiments, as shown in FIG. 4B the surface of a sports ball is pre-treated 2100 prior to the input of the sports ball within the system. The pre-treatment process 2100 includes the treatment of the material of the sports ball prior to the manufacture of the sports ball. In certain embodiments, wherein the outer surface of the sports ball is manufactured from leather, the leather is pretreated or impregnated with a pre-treatment solution prior to the manufacture of the sports ball. Thereby, the pretreatment of a sports ball prior to the input 2000 into a system is within the spirit and scope of the present invention.

In certain embodiments, the surface of a sports ball is pre-treated 2100 in a chamber for agitation such as found in U.S. Pat. No. 4,630,401 to Gary McNeil ("McNeil"); U.S. Pat. No. 4,520,598 to John Rampe ("Rampe"); U.S. Pat. No. 3,633,321 to William E. Rise ("Rise"); U.S. Pat. No. 3,724,146 to Denis Fahey, et al. ("Fahey"); U.S. Pat. No. 3,802,129 to Achille Ferrara ("Ferrara"); U.S. Pat. No. 3,948,002 to Hisamine Kobayashi ("Kobayashi"); U.S. Pat. No. 3,871,135 to Gordon Anderson ("Anderson"); U.S. Pat. No. 4,018,009 to Raymond Leliaert ("Leliaert"); U.S. Pat. No. 4,329,817 to Gunther Balz ("Balz"); U.S. Pat. No. 4,231,196 to George Jones ("Jones");—each of which are incorporated by references in their entireties for all purposes. At least one sports ball is placed within a chamber with media intended to alter the surface of the sports ball to abrade, polish or otherwise physically augment the surface of the sports ball in a manner to encourage, to limit, or to augment the adhesion of silica silylate during a pre-process surface treatment step.

Certain embodiments, such as shown in FIG. 4A-FIG. 5, comprise a method 200 and system 300 for the treatment of sports balls wherein a surface treatment step 2200 is performed wherein the surface of a sports ball is treated with silica silylate. The surface treatment step occurs in a treatment chamber 3200 wherein at least one sports ball is treated with silica silylate. The silica silylate is applied to the surface of the sports ball in a manner to produce a consistent homogenous result in surface characteristics for each sports ball which is treated in the treat chamber 3200. The treat chamber of certain embodiments comprise a vibratory chamber such as disclosed by McNeil and Rampe. The vibratory chamber of certain embodiments is filled with silica silylate while alternate embodiments comprise a combination of silica silylate and a media configured to further assist in the distribution and application of silica silylate to the sports balls. The media combined with the silica silylate of certain embodiments are selected from the list including, but not limited to steel spheres, polymeric spheres, glass beads as may be found in blasting media, ceramic spheres or cylinders, porcelain beads, plastic beads, fumed hydrophobic silica, and precipitated hydrophobic silica. Treatment chambers which use agitation methods alternative to vibratory agitation are within the spirit and scope of the present invention.

Certain embodiments of the present invention comprises a surface treatment step 2200 within a treatment chamber wherein the treatment chamber is configured to receive at least one sports ball at a time. The treatment chamber comprises a chamber wherein a sports ball enters the treatment chamber 3200 and a predetermined amount of silica silylate is added through a silica silylate input 3050 to the treatment chamber, thereby controlling the precise amount of silica silylate that a sports ball is treated with. Embodiments comprising the addition of silica silylate through an input 3050 manually, mechanically, and automatically are within the spirit and scope of the present invention.

Certain embodiments of the present invention comprises a surface treatment step 2200 within a treatment chamber wherein the treatment chamber is configured to treat at least one sports ball with silica silylate through spraying of silica silylate. The spraying of silica silylate comprises the aerosolized spray of dry silica silylate. Alternate embodiments comprises the spraying of a silica silylate suspension or silica silylate solution through a spray dryer wherein the dried silica silylate is deposited upon the sports ball. In certain embodiments, the sports ball is rotated on at least one axis at a predetermined rate to ensure a homogenous and consistent coverage of each sports ball. Spraying of a fluidized silica silylate and allowing the suspension to dry on the surface of the sports ball is within the spirit and scope of the present invention.

Figure 6:
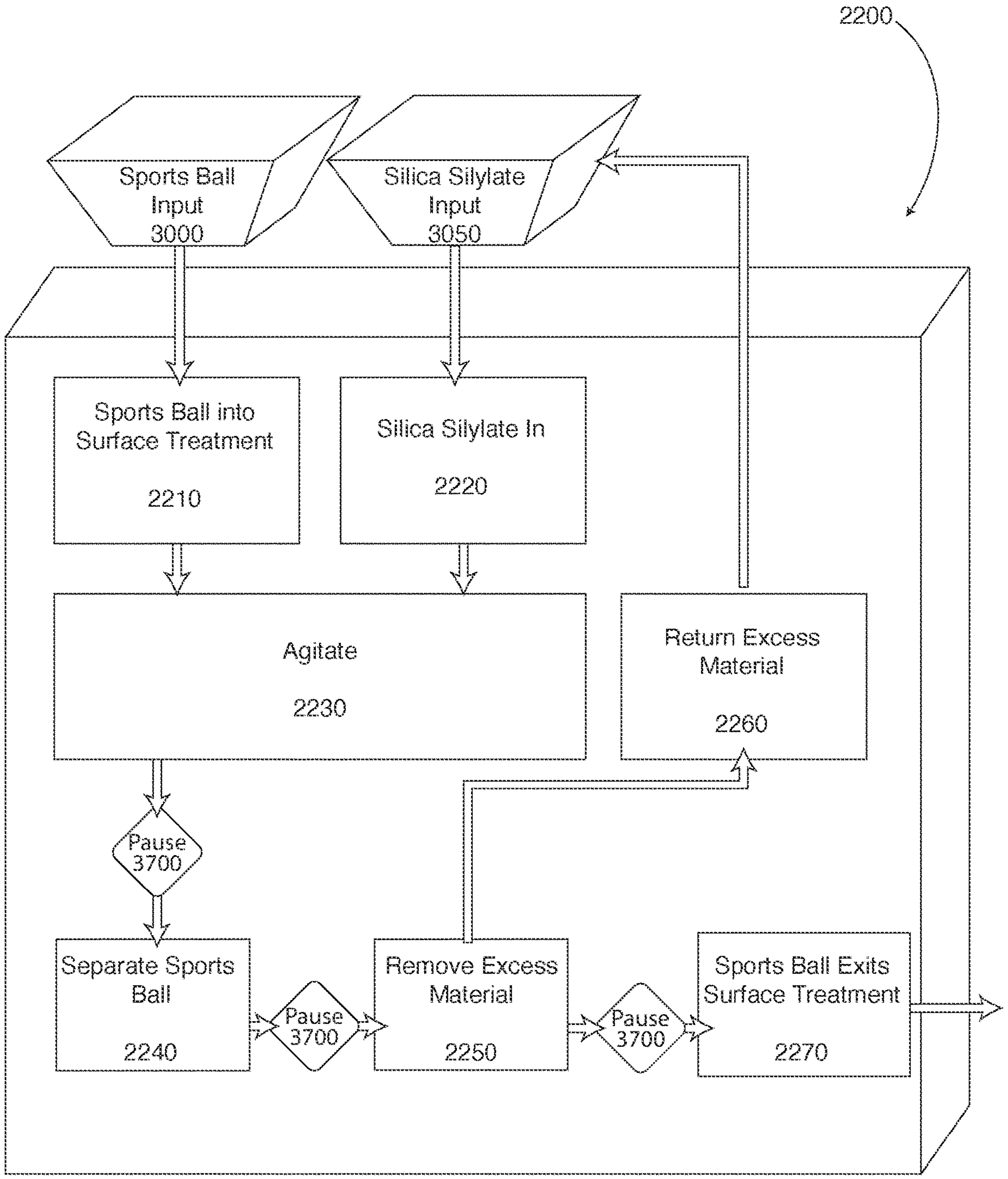

Certain embodiments of the present invention, as shown in FIG. 6, comprises a surface treatment method and system wherein a sports ball is received 2210 into the surface treatment process 2200. The sports ball is added to a chamber, and silica silylate is added 2220 to the same chamber wherein it is agitated 2230. The silica silylate is added 2220 from the silica silylate input 3050. The agitation can be accomplished through vibration, agitator, tumbling, mixing, or a combination thereof. The agitation 2230 of the sports ball with silica silylate of certain embodiments occurs with added media, while agitation 2230 of alternate embodiments occurs solely with the sports balls and silica silylate. In certain embodiments the agitating 2230 occurs for a predetermined period of time. Once the agitating step 2230 is complete, the sports ball is separated 2240 from the chamber. After separating the sports ball from the chamber, the excess material is separated 2250 from the sports ball. The separating step 2250 involves separating the sports ball from excess silica silylate as well as excess media used in the agitation 2230 step. Alternate embodiments wherein excess material is discarded after removal 2250 from the sports balls are within the spirit and scope of the present invention. In certain embodiments, the separating step 2250 is performed two or more times with a period of time in between. In certain embodiments, the period of time is about 1-60 seconds, 1-60 minutes, 1-3 hours, 3-6 hours, 6-12 hours, 1-2 days, 2-4 days, 4-7 days, or more than one week. In a preferred embodiment, the period of time is about one week. In certain embodiments, at least one separating step 2250 is performed in the chamber before the sports ball has been removed therefrom. In certain embodiments, one separating step 2250 is performed in the chamber and the sports ball is then removed from the chamber and allowed to rest for a period of time. The sports ball is then loaded into a chamber and a second separating step 2250 is performed.

Certain embodiments of the present invention, as shown in FIG. 6, comprises a device for the separation of excess material 2250 from the sports ball such as a screened separator such as those disclosed by McNeil, Rampe, Rise, Fahey, Ferrara, Kobayashi, Anderson, Leliaert, Balz, Jones, or a combination thereof. Once the sports balls are separated from the chamber in which they are agitated, they are transferred to a screened surface on which they are subject to vibration which causes excess material to fall away from the sports balls and through the screened surface. The excess material is returned to the silica silylate input 3050. Alternatively, the excess material falls through the screened surface back into the chamber for agitation, or is returned to the silica silylate input. In certain embodiments, once the excess material is separated from the sports balls, the excess material is returned 2260 to the silica silylate input 3050 for future use for treating additional sports balls. Certain embodiments of a separation mechanism comprising a screened separator comprise a vibratory aspect to assist in the separation of excess material from the sports ball after being treated with silica silylate.

In certain embodiments of the present invention, the process of removing excess material is accomplished wherein the sports ball is exposed to blasts or a stream air at a predetermined pressure and/or speed to remove excess material 2250 from the sports ball following the surface treatment 2200 process. In certain embodiments of the present invention, the process of removing excess material 2250 is accomplished through the use of suction or vacuum applied to the sports ball following the agitation 2230 of the sports ball with silica silylate.

In certain embodiments the process of removing excess material 2250 is performed through the use of abrasive, burnishing or brushing media in a vibratory or tumbling chamber separate from the chamber in which the sports balls are agitated with silica silylate. In other embodiments, the process of removing excess material 2250 is performed through the use of abrasive, burnishing or brushing media in the treatment chamber by vibration or tumbling. The media use for removal of excess material 2250 may include, but is not limited to steel spheres, polymeric spheres, glass beads, ceramic spheres or cylinders, porcelain beads, plastic beads, or fabric patches such as patches of terry cloth.

In certain embodiments the process of removing excess material 2250 is performed using a tumbling chamber comprising a smooth inner surface or with added baffles to introduce additional tumbling action. The chamber may be cylindrical or may have other shapes to introduce additional tumbling action, such as a cuboid or hexagonal shape. The inner surface of the chamber further comprises a plurality of openings adapted to allow for the uniform withdrawal of silica silylate dust out of the chamber by vacuum pressure. In certain embodiments, the tumbling chamber is rotationally mounted within a cabinet to which the vacuum pressure is applied. The cabinet comprises a door allowing access to the tumbling chamber. A pre-determined number of sports balls treated with silica silylate are introduced to the tumbling chamber through the door. Brushing media, such as towels (made of terry cloth or another material) of a pre-determined number, size and shape, or other media, including beads (plastic, metal, ceramic, porcelain, etc), rice, steel pins, crushed corn cobs, crushed walnut shells, coconut shells, are also added to the chamber. The door is then closed, and the vacuum is activated to begin dust removal from the chamber. Tumbling of the chamber is then activated for a pre-determined time period to remove excess material from the treated sports balls. In certain embodiments, the vacuum air flow is monitored by an airborne particle counter or other device to determine when excess material has been sufficiently removed and the tumbling period may end. After the tumbling period, the treated balls and media and are removed from the chamber through the door. In certain embodiments, the media is left in the chamber for subsequent treatment of additional sports balls.

In certain embodiments, it may be desired to pause 3700 between treatment steps wherein the sports ball is permitted to sit undisturbed between steps. In certain embodiments, a pause 3700 comprises a length of time up to 24 hours. In certain embodiments the pause 3700 comprises a length of time of between 24 hours to 7 days. Further still, certain embodiments wherein a pause comprises a length of time over 7 days are within the spirit and scope of the present invention. In certain embodiments it may be desired to pause 3700 between the agitation 2230 and separation 2240 steps. In certain embodiments it may be desired to pause 3700 between the separation 2240 and the step to remove excess material 2250. Further still, in certain embodiments it may be desired to pause 3700 between the step to remove excess material 2250 and the step wherein the sports ball exits surface treatment 2270. In certain embodiments it may be desirable to remove the sports ball from any treatment apparatus for the pause 3700 step, and then return the sports ball to the apparatus or another device for further removal of excess material 2250.

Figure 12B:
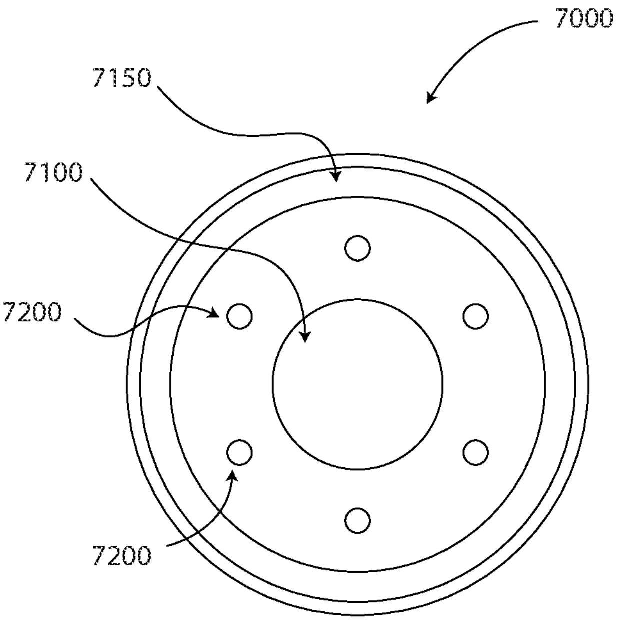
Figure 12A:
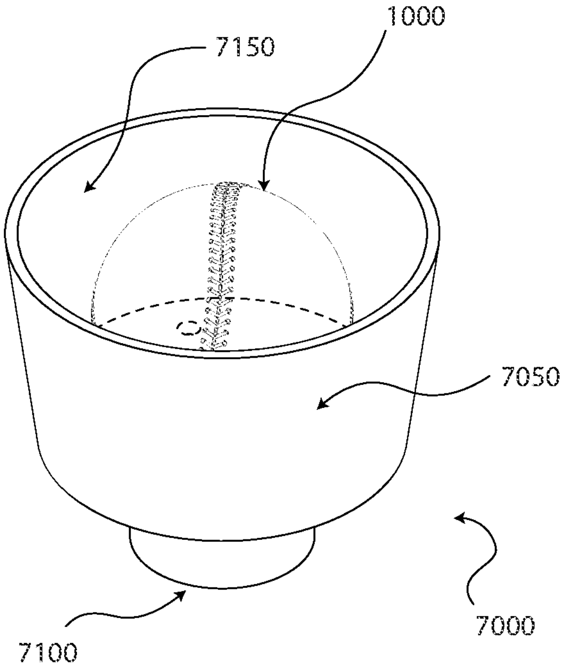
Figure 12C:
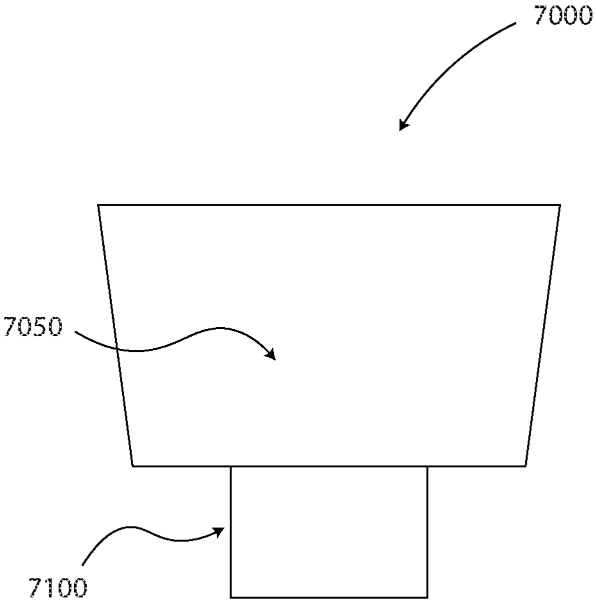

In certain embodiments, as shown in FIG. 12A-FIG. 12C, the process of removing or brushing excess silica silylate material is performed using a receptacle. In certain embodiments the receptacle 7000 comprises a conical or hemispherical shaped cup portion 7050, but may have other shapes such as a pyramid or hexagonal shaped cup. In a preferred embodiment, the cup portion 7050 has a shape concentric with the outer diameter of the sports ball so that the inner surface of the receptacle 7000 is adapted to allow contact with the sports ball around the entire inner surface. In other embodiments, the cup portion 7050 may have a trough shape with a circular or V-shaped profile. In other embodiments, the cup portion 7050 may have a flat center and raised edges like a dinner plate or frying pan. In other embodiments, the cup portion 7050 may be a substantially flat surface. The cup portion 7050 comprises a vacuum opening 7100 and an inner surface 7150. The vacuum opening 7100 is fluidly interconnected to the cup portion 7050 and is adapted to interconnect with a vacuum by a hose or port. In a preferred embodiment, the vacuum opening 7100 has a diameter that is smaller than the diameter of the sports ball to be treated within the cup portion. In another embodiment, the vacuum opening 7100 comprises a guard, i.e., a screen, grate, perforated surface, or protrusion, to prevent a sports ball from being sucked into the vacuum opening 7100. The inner surface 7150 comprises a material selected from the list including, but not limited to wool or synthetic carpet, wool or synthetic felt, leather, synthetic leather or vinyl, terry cloth, or foam. In certain embodiments, the inner surface 7150 is a substantially planar or flat sheet of material laid over the substantially flat surface of the cup portion 7050. In certain embodiments, the inner surface 7150 further comprises a plurality of openings 7200 adapted to allow for the uniform withdrawal of silica silylate dust out of the cup portion 7050 by vacuum pressure. The openings 7200 may be holes through the material or, in certain embodiments, channels formed within the material. In certain embodiments, the inner surface 7150 comprises an opening that is fluidly interconnected to the vacuum opening 7100. In certain embodiments, the inner surface material is sufficiently porous to allow silica silylate dust to pass through to the vacuum opening 7100. In certain embodiments, receptacle 7000 is interconnected to a port on the cabinet referenced in the preceding paragraph, and the vacuum opening 7100 is fluidly interconnected with the cabinet vacuum. In this configuration, the receptacle 7000 may be used in conjunction with the use of the tumbling chamber or instead of using the tumbling chamber when only a small number of sports balls need to be treated. In use, the receptacle 7000 is interconnected to the vacuum by vacuum opening 7100. The vacuum is activated to introduce a vacuum pressure to the cup portion 7050. A sports balls treated with silica silylate is placed into the cup portion 7050 and manually manipulated to abrade the ball surface against the inner surface 7150 in order to remove excess silica silylate from the surface. The silica silylate dust is evacuated by the vacuum pressure within the cup portion 7050. When it is determined that the excess silica silylate has been sufficiently removed from the sports ball, the ball is then removed from the cup portion 7050.

In certain embodiments, the removal of excess material 2250 is performed through alternate processes including, but not limited to brushing, wiping, or electrostatically.

Certain embodiments of the present invention comprise a dust abatement system surrounding particular aspects of a system for treating sports balls with silica silylate. For instance, as shown in FIG. 5 a dust abatement system 3600, surrounds the components of the system used for treating 3200 sports balls with silica silylate. A dust abatement system applied to the portions configured to treat 3200 sports balls can be applied to a combination of system elements, to individual components, or a combination thereof. Certain embodiments of a dust abatement system use filters for the separation of silica silylate dust from the ambient air surrounding the components for treating 3200 sports balls. Embodiments employing screens, semi-permeable membranes, foam filters, fabric filters, paper filters, and a combination thereof are within the spirit and scope of the present invention. In certain embodiments, electrostatic filtration methods are employed to remove particulate silica silylate from the air surrounding systems used for treating 3200 sports balls with silica silylate. In other embodiments, the dust abatement system 3600 is applied to openings in the systems for treating sports balls, including to any openings in the sports ball input 3000, the treatment chamber 3200, the silica silylate input 3050, the inspection system 3300, the post-process 3400, and/or the sports ball output 3500.

In certain embodiments of the present invention, inspection of a treated sports ball 2300 is performed in an inspection system 3300 to confirm that a consistent and homogenous application of silica silylate is applied to at least one sports ball. The inspection 3300 system provides a pass 2310 or fail 2320 determination of the sports ball after treatment 2200 with silica silylate. In certain embodiments the fail 2320 determination initiates a process to automatically return the sports ball for surface treatment 2200 once again. In certain embodiments a fail determination 2320 results in a notification to a user to inspect the sports ball following treatment, and/or to once again input the sports ball 2000 into the system for surface treatment. In certain embodiments, (n) is the number of times a single sports ball receives a fail determination 2320. When a fail determination 2320 is reached, the system compares 2325 (n) to a predetermined failure threshold (x). If n is greater than or equal to x, the system notifies the user 2330. In certain embodiments, (n) is the aggregate number of times a fail determination 2320 is reached in a given batch of a plurality of sports balls. When a fail determination 2320 is reached, the system compares 2325 (n) to a predetermined failure threshold (x). If (n) is greater than or equal to (x), the system notifies the user 2330. In certain embodiments, a notification to the user 2330 results in the system entering a standby mode, awaiting input from the user. In certain embodiments, a notification to the user 2330 includes instruction to the user to inspect the system, and recalibrate if necessary. In certain embodiments, if (n) is greater than or equal to (x), the system will reject the sports ball to a reject container or other device. In certain embodiments, inspection of a treated sports ball is performed after separating step 2250 has been performed at least two or more times. If the inspection 3300 system provides a pass 2310, the sports ball proceeds to post-process treatment 2400 as described herein. After post-process treatment 2400, the sports ball proceeds to output 2500.

Figure 7:
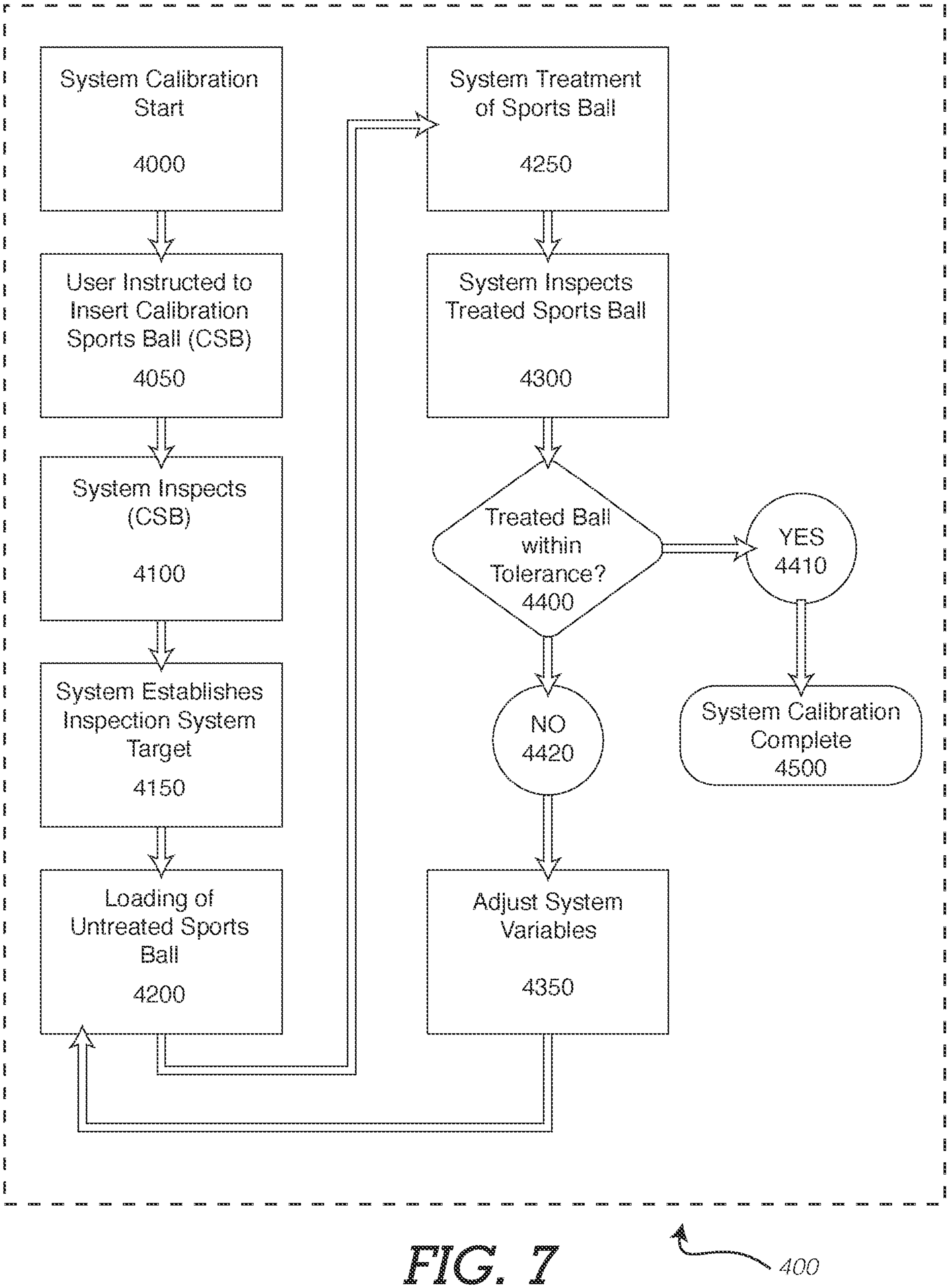

In certain embodiments, a system requires calibration when initializing for use, or when the user is notified 2325 to recalibrate the system for treating sports balls with silica silylate. The system calibration method 400 of certain embodiments, as shown in FIG. 7, comprises an initializing step of starting the system calibration 4000. The user is instructed to insert a calibration sports ball 4050. The calibration sports ball is a calibration tool which represents the optimal surface characteristics of a sports ball treated with silica silylate. Based on inspection readings of the calibration sports ball, the system establishes inspection targets 4150 to match the inspection readings to of the calibration sports ball results 4100 with a predetermined allowable tolerance. An untreated sports ball is loaded 4200 which the system proceeds to treat 4250 with standard programmed processes. Following treatment of the sports ball, the system then inspects the treated sports ball 4300. The system them compares the inspection of the treated sports ball 4300 to the newly established inspection system target. If the inspection results are within the predetermined tolerance of the established inspection system target, the system confirms within tolerance 4410 and the system calibration is complete 4500. However, if the inspection results are not within the predetermined tolerance of the established inspection system target, the system confirms a negative test result 4420. The system variables are then adjusted in accordance with the negative test results to attempt to match the system output of a treated sports ball with that of the established system target 4150. Variables which can be adjusted include, but are not limited to, amount of silica silylate in the treatment portion of the system, temperature of system treatment, pressure of system treatment, humidity in pre-treatment, humidity in system treatment process, vibration frequency, vibration amplitude. Embodiments wherein the adjustment of system variables 4350 are automatically adjusted, as well as embodiments wherein a user adjusts system variables 4350 manually, are each within the spirit and scope of the present invention. Following adjustment of system variables, an untreated sports ball is loaded 4200 once again, and treated 4250 by the system with silica silylate for inspection 4300 and comparison 4400 with established inspection system target 4150. The process of steps 4200 through 4400 until a positive test result 4410 is reached, thus completing 4500 the system calibration.

Figure 8:
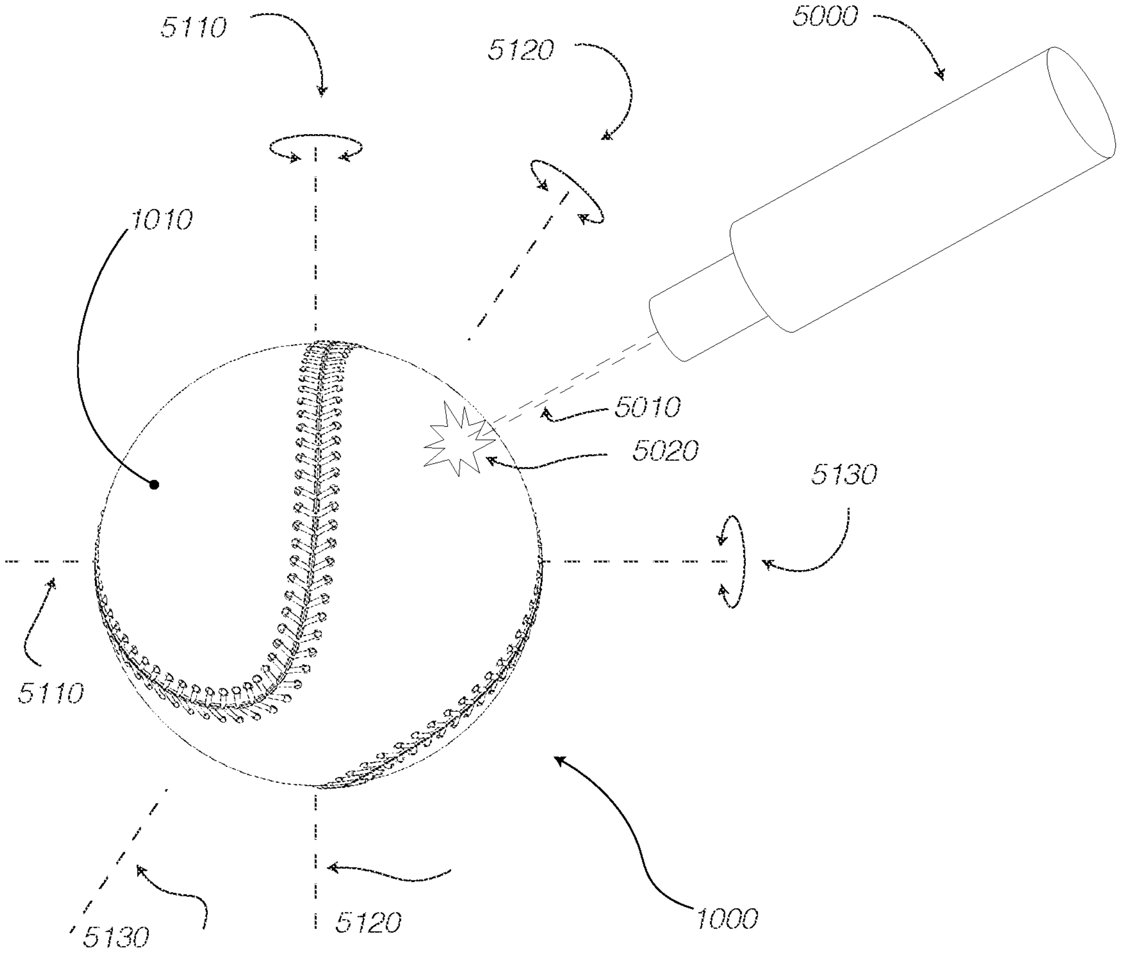

The inspection system 3300, as shown in FIG. 5, of certain embodiments comprises at least one method of testing the surface condition of a treated sports ball. Certain embodiments, shown in FIG. 8, use laser spectroscopy to determine the surface condition of a treated sports ball. The use of laser spectroscopy involves the use of a laser 5000 to shine a laser beam 5010 on at least a first point 5020 on the exterior surface 1010 of the sports ball. A plurality of points is used to confirm a homogenous and consistent treatment of silica silylate. In certain embodiments the sports ball is rotated 5100 at a predetermined rate on at least one axis (5110, 5120, 5130) during inspection with laser spectroscopy. The rotation 5100 of the sports ball 1000 allows for the rapid assessment of a large number of points on the exterior surface 1010 for assessing the overall average surface treatment results of the sports ball.

In certain embodiments the inspection system 3300 of certain embodiments, as shown relies on optical assessment of the sports ball after treatment with silica silylate. Optical assessment of a sports ball can be performed with qualification and quantification of variables including, but not limited to color, surface gloss, surface reflectivity, or a combination thereof.

In certain embodiments surrounding a method 200 for treating a sports ball with silica silylate, as shown in FIG. 4A-FIG. 4B, the surface testing 2300 step is performed optically with a microscope. By viewing the sports ball with a microscope after processing, in an automated machine process or by a human user, the surface structure and condition of the sports ball can be assessed to inspect the quality of surface treatment with silica silylate. In certain embodiments the inspection system 3300 comprises the application of an indicator to the sports ball surface prior to or during the treatment process. The indicator is adapted to be abraded from the ball surface at a predetermined rate during the treatment process and provide optical of visual confirmation that at least a portion of the treatment process has been completed. For example, the indicator may comprise a mark of paint, grease, graphite, adhesive label, or other marking material that adheres to the sports ball surface but that may be removed through abrasion.

The application of silica silylate to the external surface of a sports ball will result in a change of material properties on the external surface of the sports ball. In certain embodiments, the inspection system 3300 comprises a surface conductivity measurement device, wherein the surface conductivity of the sports ball is measured after treatment with silica silylate. In certain embodiments, the external surface of the sports ball is tested 2300 (FIG. 4A-FIG. 4B) for the electrical conductivity of the external surface before and after the surface treatment process 2200 wherein the results of the surface testing before and after treatment are compared.

Figure 9:
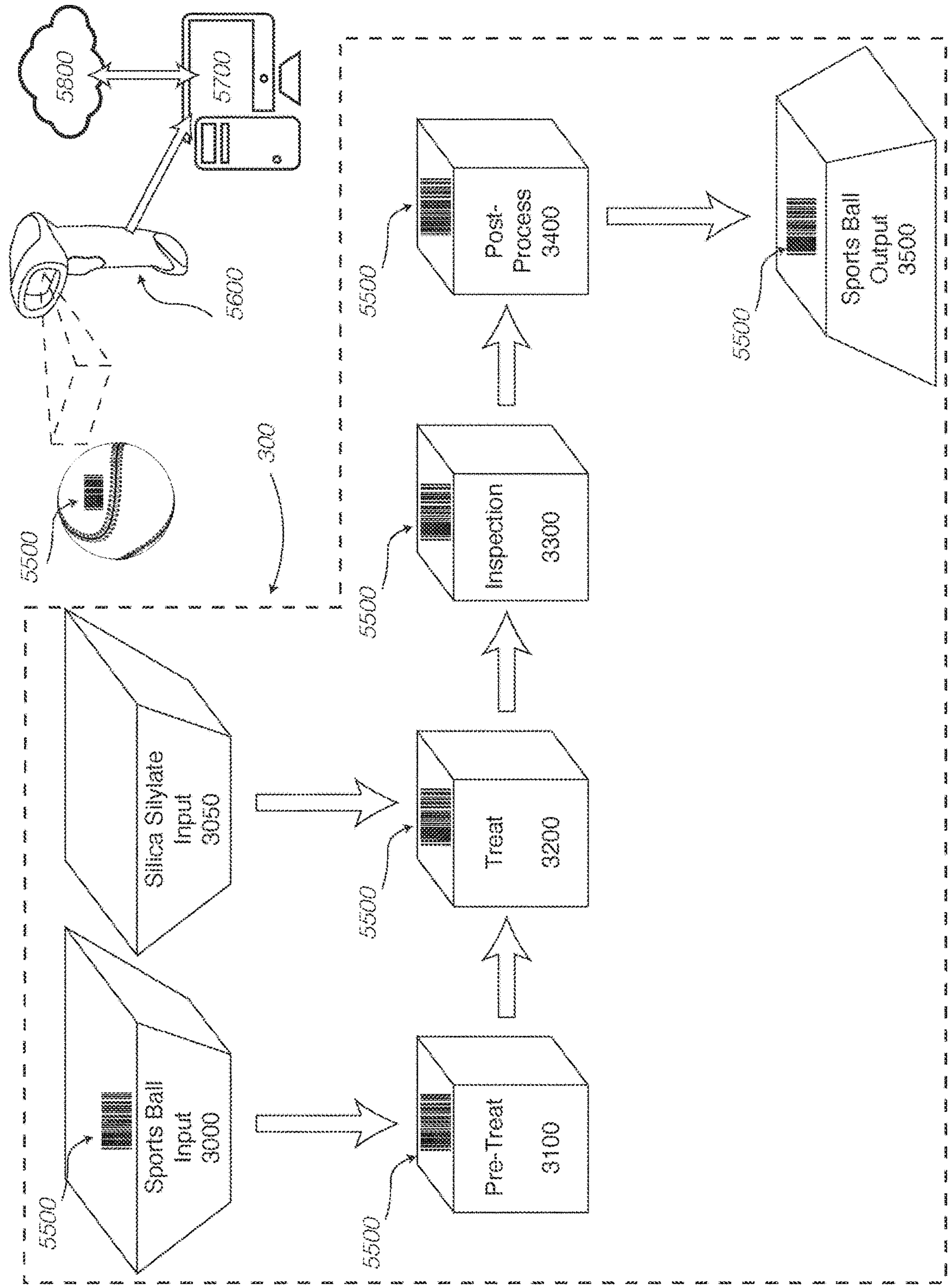
Figure 10:
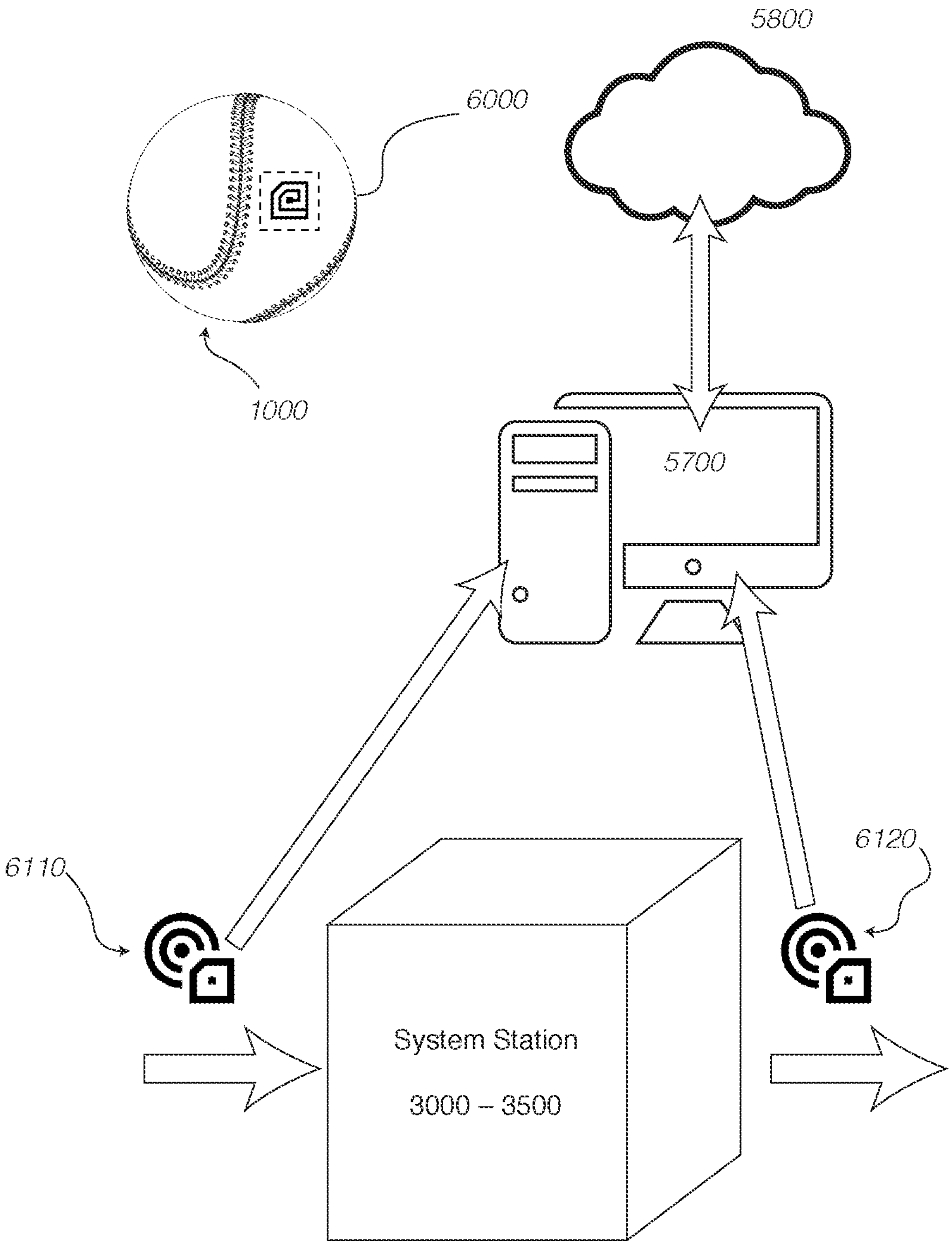

Certain embodiments, such as shown in FIG. 4A-FIG. 5, comprise a method 200 and system 300 for the treatment of sports balls wherein a surface treatment step 2200 is performed wherein the surface of a sports ball is treated with silica silylate. In certain embodiments each step of the method correlating to a system station is tracked with asset tracking to ensure that each step of the process is performed as prescribed. In certain embodiments, as shown in FIG. 9, each station of the system for treating a baseball with silica silylate is marked with a discrete barcode 5500, such as a data matrix or QR code, and each sports ball 1000 is individually marked with a discrete barcode 5500, such as a data matrix or QR code. Prior to each station of the system (e.g., 3000-3500) each barcode 5500 of the sports ball is scanned with a scanner 5600 and each barcode 5500 of each station is scanned with a scanner. Then following the completion of each sports ball 1000 though each station of the system, the barcode 5500 of each sports ball is scanned. The scanner is in communication with a computer system 5700, which in some embodiments is in communication with a cloud-based computing system 5800, wherein the data associated with each sports ball is recorded. Thus, the treatment of each sports ball 1000 is able to be tracked, and the performance of each system for the treatment of a sports ball can be recorded, tracked, and assessed in relation to other systems. Although embodiments of an asset tracking system have been disclosed surround the use of barcodes, alternate methods of asset and process tracking are within the spirit and scope of the present invention. In certain embodiments, as shown in FIG. 10, each sports ball 1000 comprises an RFID tag 6000 embedded therein, and each station (e.g., 3100-3500) comprises a first RFID sensor 6110 intended to record the input of a sports ball into a system station, and a second RFID sensor intended to record the output of a sports ball out of a system station. The RFID sensors 6110, 6120 are in communication with a computer system 5700 which is in communication with a cloud-based computing system 5800 wherein the data associated with each sports ball is recorded. Thus, the treatment of each sports ball 1000 is able to be tracked, and the performance of each system for the treatment of a sports ball can be recorded, tracked, and assessed in relation to other systems.

Certain embodiments of the present invention comprise a system, as shown in FIG. 9, comprise a system 300 for the treatment of a sports ball 1000 with silica silylate wherein key system variables are tracked for the purposes of asset tracking, system performance, and system status. Key variables which are tracked in certain embodiments include: time in process, temperature of process, humidity in process, duration in process, vibration frequency, vibration amplitude, weight monitoring of silica silylate input, weight monitoring of treating station, weight monitoring of the sports ball input, or a combination thereof. The measurement of such key variables are not limited to one particular system station, for instance it is desired in certain embodiments to monitor process humidity in all system steps including the sports ball input 3000, silica silylate input 3050, pre-treatment 3100, treatment 3200, inspection 3300, post-process 3400, and the sports ball output 3500. In certain embodiments, most or all of the process of treating sports balls is conducted with an ambient environment of less than about 80% relative humidity and less than about 85 Fahrenheit.

Furthermore, in certain embodiments wherein a conveyor or other motor driven manner of conveyance to transfer at least one sports ball from one system station to another system station, a motor load sensor is used to assess the power draw from the motor wherein the power draw of the motor correlates to the number of sports balls on the motor driven manner of conveyance. An increased number of sports balls correlates to an increase in load, and an increase of load requires an increase of power to maintain a predetermined motor rotation rate. Thus, the monitoring of power draw from the motor can be used to indicate: the number of sports balls in process; whether a treatment chamber has the correct number of balls and/or the correct amount of treating materials other media; and/or a predictive indicator of equipment failure or bearing and motor wear so replacement equipment can be put in place prior to a forced stoppage.

Figure 11:
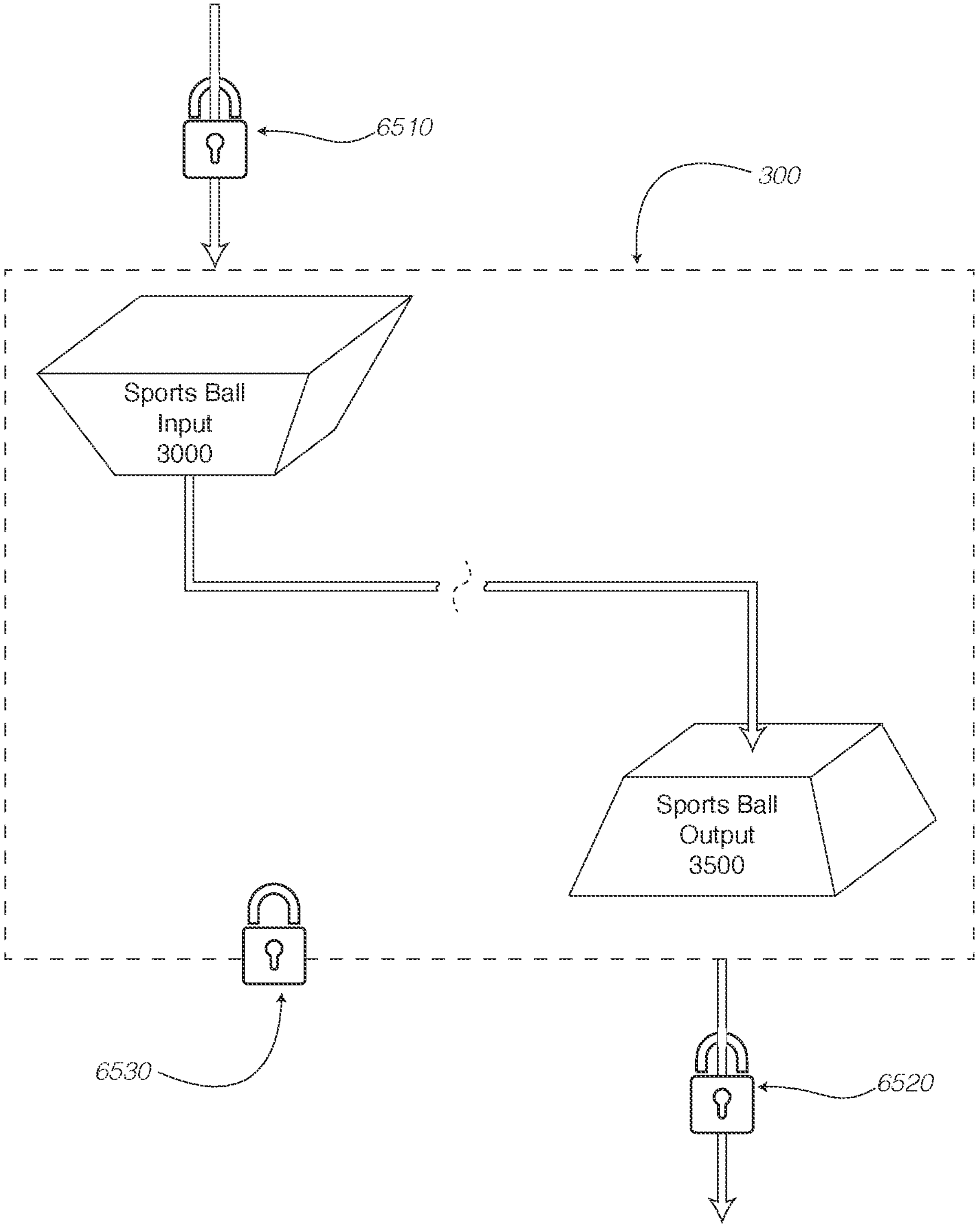

In certain embodiments of a system 300, as shown in FIG. 11, for the treatment of sports balls with silica silylate, a first access control point 6510 prevents access to the sports ball input 3000 by unauthorized personnel to prevent unauthorized use of the system 300. A second access control point 6520 prevents access to the sports ball output 3500 by unauthorized personnel to prevent the unauthorized access to sports balls which have undergone treatment with silica silylate. In certain embodiments, an access control point prevents access to the system stations (e.g., 3000-3500) to prevent unauthorized personnel from accessing, inspecting, tampering with, or using the system 300. In certain embodiments, the system 300 may be controlled by a user only by a single start button or switch which can be either mechanical or represented in a graphical user interface.

Figure 13:
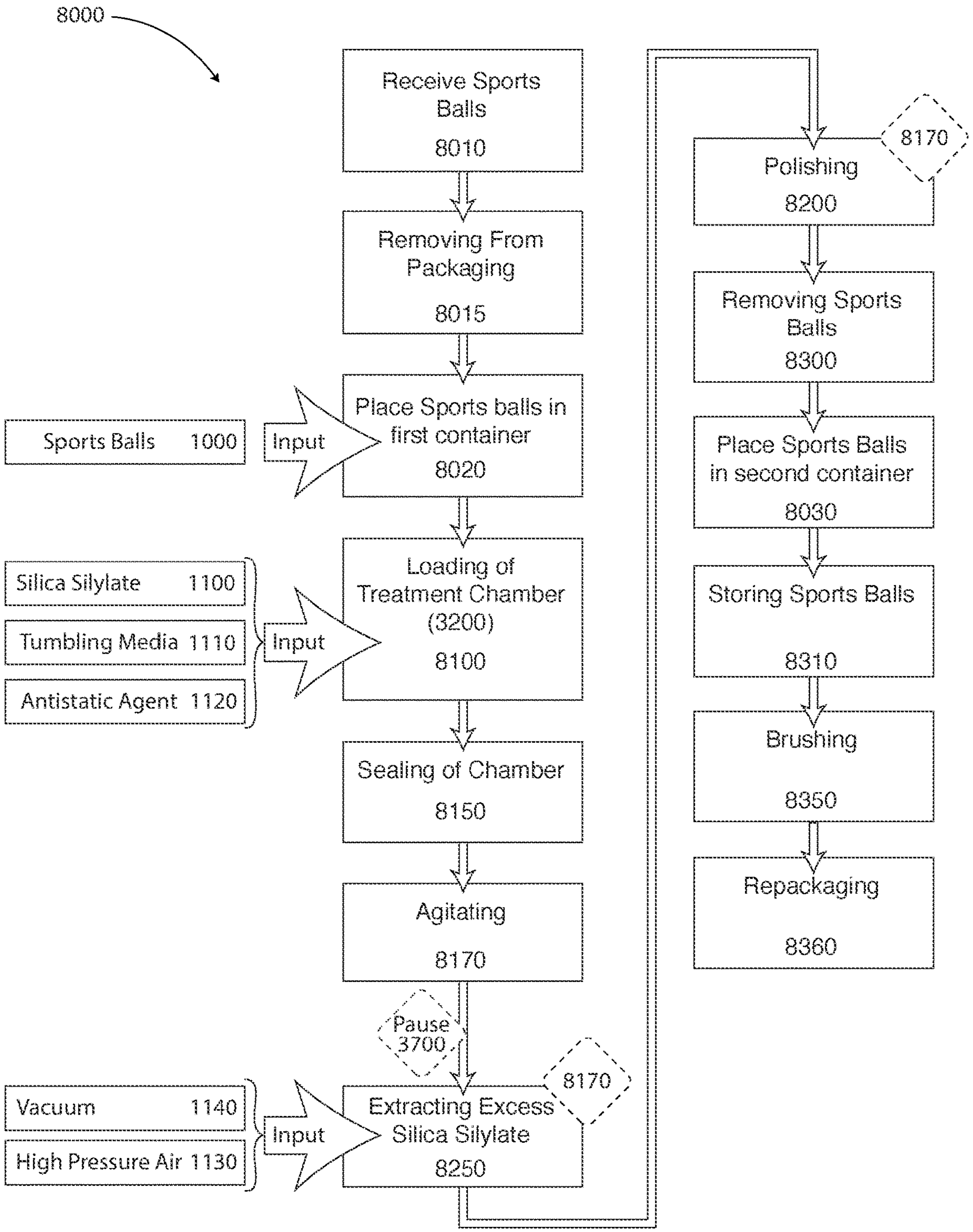

Certain embodiments of the present invention, as shown in FIG. 13 for instance, comprise a process 8000 for the treatment of sports balls wherein the sports balls are treated with silica silylate. The process comprises steps of receiving 8010 the sports balls, treating 8100 the sports balls, polishing 8200 the sports balls, and packaging 8300 the sports balls. When receiving 8010 sports balls, the sports balls can be received as individual units or packaged in bulk. When removing 8015 sports balls from any existing packaging, the packaging can be reserved for reuse. The individual balls are placed into a first container 8020 having a first color wherein the first color indicates the sports balls contained therein have not been treated. The sports balls are placed in a second container 8030 following treatment, wherein the second containers comprise a second color wherein the second color indicates the sports balls contained therein have been treated. In certain embodiments, a container comprising a color is used to indicate that the sports balls contained therein are in pause step 3700.

Following the receiving 8010 step, the sports balls 1000 are added to a treatment chamber 3200 during a loading step 8050 wherein the sports balls are exposed to silica silylate 1100 for the treating 8100 step. In certain embodiments, the treatment chamber 3200 comprises a cylindrical shape such as a 55-gallon drum, but the treatment chamber is not limited thereto. In certain embodiments, based on the size and shape of the sports ball 1000 in relation with the size and shape of the treatment chamber 3200, a varying number of sports balls may be added within the treatment chamber 3200. In certain scenarios it may be desired to add hundreds of sports balls (such as 12 dozen or 24 dozen) to the treatment chamber 3200, while in alternate scenarios using alternate sports balls, it may be desired to add 12 or less sports balls to the treatment chamber.

Furthermore, during the loading step 8050, the silica silylate 1100 is added to the treatment chamber 3200 (FIG. 14A-FIG. 14F) in an amount correlated to the number of sports balls being treated. The amount of silica silylate can vary in accordance with shape, size, and surface area of a sports ball. In certain embodiments it may be desired to add between 0-12 ounces of silica silylate per sports ball treated. In certain embodiments it may be desired to add 8 ounces of silica silylate 1100 for each dozen of sports balls added to the treatment chamber 3200. In certain embodiments, more than 12 ounces of silica silylate 1100 per sports ball is added to the treatment chamber.

In certain embodiments, it may be desired to add tumbling media 1110 during the loading step 8050 within the treatment chamber 3200 with the sports balls 1000. In certain embodiments, the tumbling media 1110 comprises polymeric beads (e.g. HDPE) while alternate embodiments comprise a ceramic based tumbling media (e.g. aluminum oxide), porcelain tumbling media, glass tumbling media, organic tumbling media (e.g., walnut shell), or metal tumbling media. In certain embodiments the tumbling media 1110 comprises a granular size of under 0.25 inches. Alternately it may be desired to use tumbling media comprising a granular size having a maximum diameter or dimension of between 0.15 inches and 0.17 inches. However, the use of tumbling media 1110 of other sizes or shapes is within the spirit and scope of the present invention wherein the tumbling media can be adapted for the treatment of various objects, materials, shape and intended use.

In certain embodiments it may be desired to add an antistatic agent 1120, such as polyethylene glycol to the treatment chamber 3200 during the loading step 8050. Adding an antistatic agent 1120 such as polyethylene glycol (e.g., PEG 200, PEG 400, or PEG 800 but not limited thereto) can be added dependent upon environmental conditions such as ambient humidity. Adding an antistatic agent 1120 prevents the sports balls from building a static charge which can impede the bonding of the silica silylate with the sports balls, or impede the removal of excess silica silylate 1100 from the sports balls.

In certain embodiments, as shown in FIG. 14A-FIG. 14F for instance, the treatment chamber 3200 comprises an open end 3210, and a vented end 3220. In certain embodiments the end 3220 comprises a mesh surface 3225 wherethrough air can pass through. The mesh surface 3225 can be sealed with a cover 3228, and the open end 3210 can be sealed with a cover 3218. In certain embodiments the cover 3218 comprises a conical form having a port 3240 therethrough. The port 3240 is adapted for the interconnection of a dust abatement system 3600 (FIG. 5) which is configured to draw a vacuum through the port 3240. In certain embodiments it may be desired to interconnect a mesh layer 3215 between the open end 3210 of the treatment chamber 3200 and the cover 3218 to prevent the escape of the tumbling media 1110 with the silica silylate 1100 during the process to extract the excess silica silylate 8250 (FIG. 13) with a vacuum 1140. The port 3240 comprises a first end 3241 interconnected with the cover 3218 and a second end 3242 coaxially interconnected with the first end 3241. The second end 3242 extends away from the top cover 3218. The first end 3241 and the second end 3242 of the port are configured to be coaxially interconnected however the first end 3241 and the second end 3242 of the port are configured to allow independent rotation in relation to each other. Thus, when the treatment chamber 3200 is rotated, the interconnected top cover 3218 rotates with the treatment chamber 3200 while the second end 3242 of the port remains static for the interconnection of a dust abatement device 3800. In certain embodiments a port cover 3244 and the cover 3228 are used to seal the treatment chamber 3200 during the sealing step 8150 which are later removed for the extracting step 8250.

In certain embodiments, shown in FIG. 14A-FIG. 14F for instance, the treatment chamber 3200 comprises an agitating feature 3250 within the treatment chamber 3200 to provide agitation of the sports balls and other materials placed within the chamber, wherein the agitating feature 3250 is adapted to induce mixing of the contents within the treatment chamber 3200. In certain embodiments the treatment chamber 3200 comprises an agitating feature 3250 extending longitudinally within the treatment chamber 3200 located between the top 3210 and the bottom 3220 of the chamber, and extending radially inward from the sidewall 3205 of the chamber. In certain embodiments an agitating feature 3250 comprises an arced profile wherein a first end of the arc and the second end of the arc are interconnected with the sidewall of the chamber, and the arced profile extends radially inward from the sidewall, wherein the agitating device 3250 is configured to displace sports balls away from the side-wall 3205 of the treatment chamber to encourage mixing during the process of treating sports balls. In certain embodiments the treatment chamber 3200 comprises a plurality of agitating features 3250.

In certain embodiments, shown in FIG. 14A-FIG. 14F for instance, the treatment chamber 3200 comprises an agitating feature 3260 having at least one opening 3265 adapted to allow the silica silylate and the tumbling media to pass therethrough while preventing the passage of a sports balls therethrough. Therefore, the sports ball is separated away from the side-wall 3205 while the silica silylate and tumbling media passes through the opening 3265 of the second agitating feature 3260. In certain embodiments the agitating feature 3260 extends longitudinally within the treatment chamber 3200 located between the top 3210 and the bottom 3220 of the chamber, and extending radially inward from the sidewall 3205 of the chamber. In certain embodiments the first end 3261 of the agitating feature comprises an angular offset 3263 from the second end 3262 of the agitating feature. Accordingly, when the treatment chamber 3200 is oriented in a horizontal orientation for instance, the agitating feature 3260 acts as a screw wherein the sports balls are directed toward the top 3210 of the treatment chamber when the treatment chamber is rotated in a first direction 3271, and wherein the sports balls are directed toward the top 3210 of the chamber when the treatment chamber is rotated in a second direction 3272.

Once again referencing FIG. 13, after the sports balls and other desired materials are added into the chamber during the loading step 8100, the ends of the chamber are sealed in a sealing step 8150 and the chamber is agitated for a predetermined period of time for an agitating step 8170. In certain embodiments the agitation comprises rotating the chamber about an axis for a predetermined period of time. In certain embodiments the rotation of the chamber occurs at a rate between 0-60 rpm, while in certain embodiments the chamber is rotated between 10-15 rpm. However, in alternate embodiments, the chamber is rotated at a speed slower than 10 rpm or faster than 60 rpm.

Figure 14A:
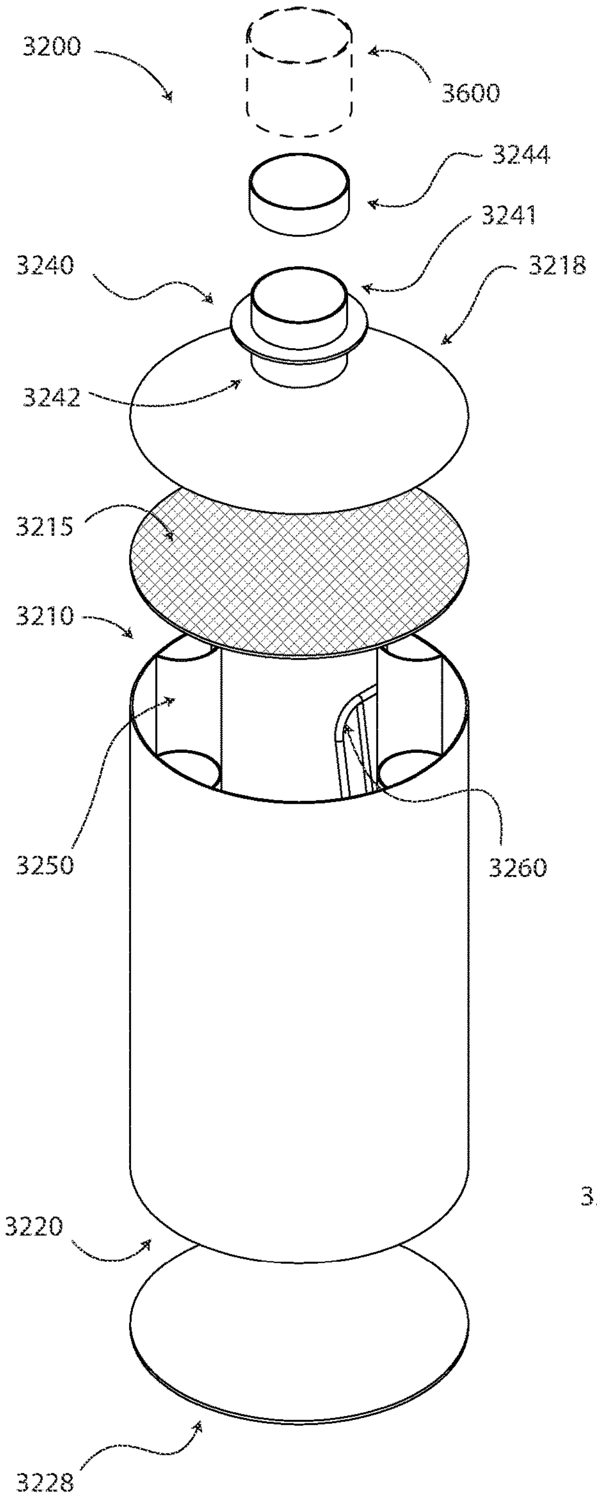
Figure 14B:
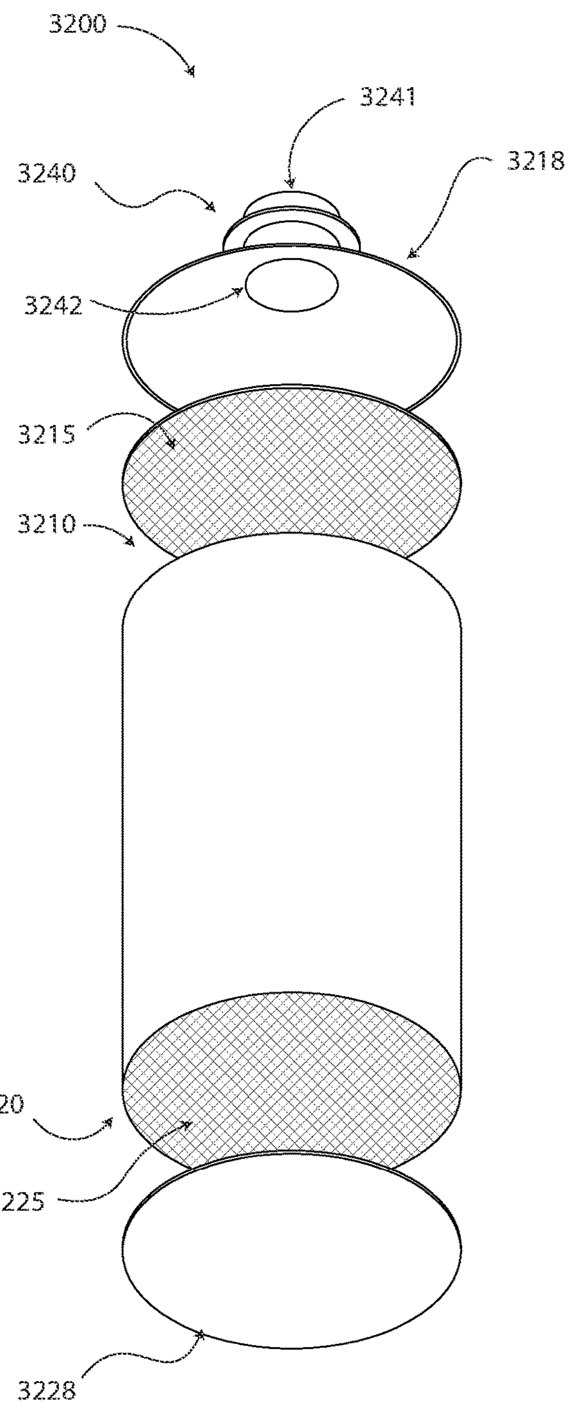
Figure 14C:
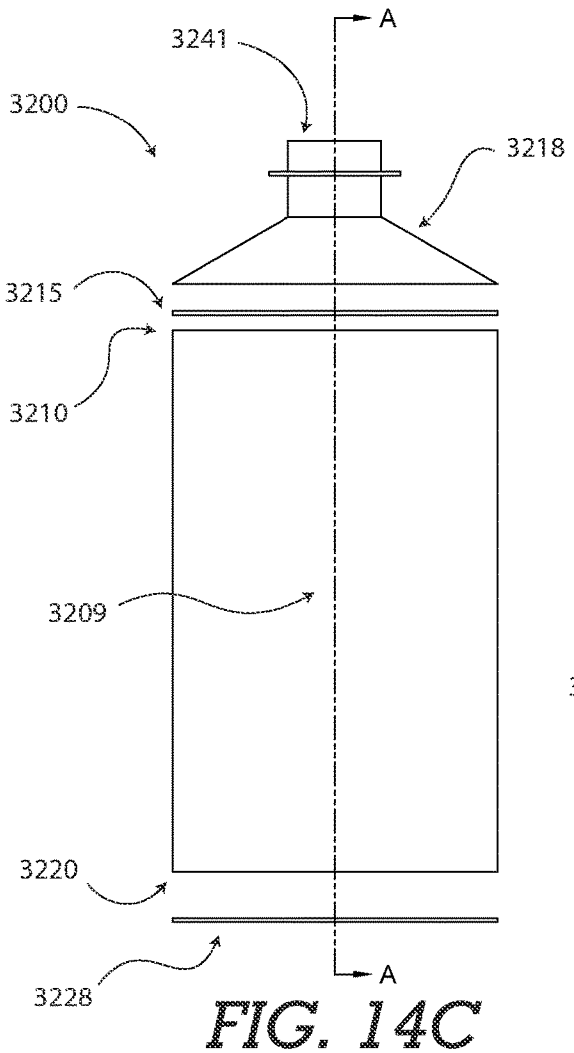
Figure 14D:
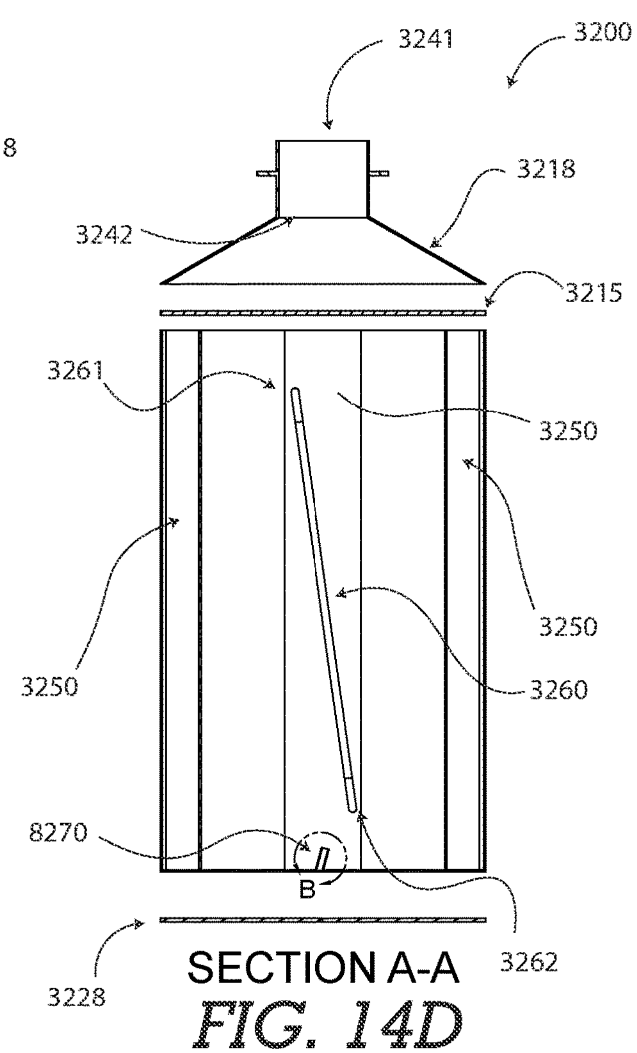
Figure 14E:
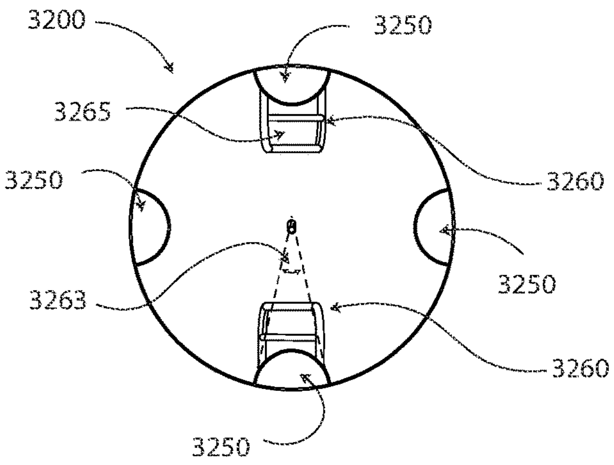
Figure 14F:
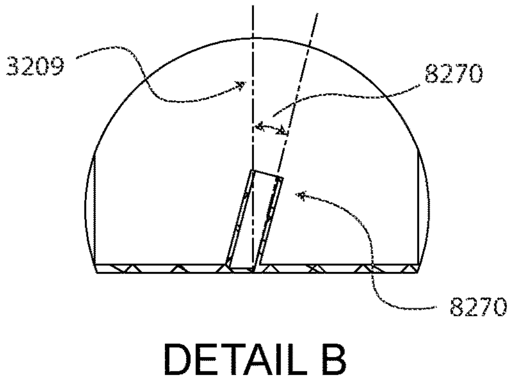

In certain embodiments, referencing FIG. 13-FIG. 14F for instance, the chamber is disposed at an angle wherein the axis of rotation 3209 is between 0 degrees and 90 degrees from horizontal for the agitating step 8170. However, in certain embodiments it may be desired for the chamber to be disposed at an angle of 0-10 degrees. In certain embodiments the chamber is rotated for a period of time between 10 minutes to one hour. While it may be desired to rotate the chamber for 45 minutes in certain embodiments, in alternate embodiments the chamber is rotated for less than 10 minutes or more than one hour. In certain embodiments the time of treatment is based on a desired level of measured and perceived surface conditions including hydrophobicity and surface roughness.

Following the agitating step 8170, it may be desired to pause 3700 prior to initiating a polishing 8200 step. The pause 3700 comprises a span of time typically between 24 hours and 7 days, however, in certain embodiments, the pause is less than 24 hours or longer than 7 days. In certain embodiments, a first polishing 8200 step is performed, and the sports balls are then removed for pause 3700. Afterwards, the sports balls are reloaded into the chamber for at least one additional polishing 8200 step.

In certain embodiments, shown in FIG. 13-FIG. 14F for instance, the polishing step 8200 comprises agitating 8170 the chamber while extracting 8250 the unused and excess silica silylate from the chamber. The extracting 8250 of the unused silica silylate is typically performed with a vacuum 1140 drawn through the mesh surface 3225 in the bottom of the chamber and through the port 3240 of the top cover. In certain embodiments, the port 3240 is configured to allow the interconnection of a vacuum system such as a dust abatement 3600 or vacuum. While extraction of the dust described and shown herein flows from the bottom 3220 of the chamber towards the top 3210 of the chamber, alternate flow paths are within the spirit an scope of the present invention.

It may be desired to continue agitating 8170 the treatment chamber while drawing a vacuum 1140 to extract the silica silylate dust, and continue agitating 8170 during the polishing step 8200 to polish the surface of the sports balls while removing excess silica silylate material. In certain embodiments extracting 8250 silica silylate includes the use of a high-pressure nozzle 8270 disposed at the bottom of the chamber and is used to provide high-pressure air 1130 for the purpose of making the remaining and excess silica silylate airborne for easier extraction with a vacuum system.

In certain embodiments, shown in FIG. 14E-FIG. 14F, the high-pressure nozzle 8270 comprises an angle 8275 away from the axis of rotation 3209 to facilitate the use of high-pressure air to remove excess silica silylate from the surface of the sports balls. In certain embodiments it may be desired to provide high-pressure air in short bursts, while alternatively it may be desired to provide high-pressure air in a continuous manner.

In certain embodiments, shown in FIG. 13-FIG. 14F for instance, the mesh surface 3225 in the bottom of the chamber is sealable wherein during the treating step 8100 the vents are in a closed position, and wherein the extracting step 8250 the air is permitted to flow therethrough and are opened for the extraction of the unused silica silylate. In certain embodiments the mesh bottom 3225 is closed with a bottom cover which is installed during loading step 8100 through the agitating steps 8170, and removed during the extracting step 8250. Although embodiments disclosed herein surround a mesh surface 8225 for the flow of air therethrough, the use of resealable vents are within the spirit and scope of the present invention.

In certain embodiments, shown in FIG. 13 for instance, the extracting step 8250 is performed prior to the polishing step 8200, however it may be desired to perform the extracting step 8250 during a portion of the polishing step 8200, or throughout the duration of the polishing step 8200. In certain embodiments the extracting 8250 of silica silylate further comprises the use of vacuum 1140 and high-pressure air flow through the high-pressure nozzle 1130 for a predetermined number of rotations or predetermined amount of time.

Certain embodiments further comprise a resting step wherein the sports balls are rested prior to use. The resting step allows for the silica silylate to fully bond with the sports balls and prevent premature use of the sports balls. The resting step can occur prior to or after an optional repackaging step 8360 wherein the sports balls are repackaged prior to delivery for use. The repackaging step 8360 can reuse the packaging material from which they were unpackaged, alternately new packaging material can be used. The resting step of certain embodiments comprises between 0-24 hours, while alternate embodiments comprise a time span of 24 hours to 7 days, or over 7 days. In a preferred embodiment, the resting step environment is 45-65% relative humidity and 65-75 Fahrenheit. In other embodiments, the resting step environment is 40-70% relative humidity and 60-80 Fahrenheit or 35-75% relative humidity and 50-90 Fahrenheit.

Following the resting step of certain embodiments, a brushing step 8350 is performed to remove any excess silica silylate which has not bonded to the sports ball. The brushing step 8350 can be performed in bulk such as with machinery specifically adapted to brush the sports ball, or can be done for instance by hand on an individual basis. In certain embodiments, the sports ball is loaded into a chamber with brushing media and the chamber is agitated for a period of time to remove any excess silica silylate. After the period of time, excess silica silylate is removed from the chamber using the processes described herein, and the sports ball is then removed from the chamber. In certain embodiments, the brushing step 8350 can be performed before or after the repackaging step 8360.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as additional items.

What is claimed is:

1. A method for the treatment of a sports ball with silica silylate comprising:

loading a treatment chamber with a plurality of sports balls;

loading the chamber with a predetermined amount of silica silylate;

agitating the chamber;

removing the sports balls from the chamber; and resting the sports balls for a second period of time.

2. The method of claim 1, further comprising removing at least a portion of the silica silylate from the chamber.

3. The method of claim 1, further comprising loading the chamber with tumbling media prior to agitating the chamber for a first period of time.

4. The method of claim 3, further comprising loading the chamber with an antistatic agent.

5. The method of claim 4, wherein the antistatic agent comprises polyethylene glycol and the tumbling media comprises HDPE.

6. The method of claim 1, wherein agitating of the chamber comprises rotating the chamber about a first axis.

7. The method of claim 6, wherein rotating of the chamber occurs at a rate of about 10 to 15 rpm.

8. The method of claim 2, further comprising agitating the chamber during the removal of at least a portion of the silica silylate from the chamber.

9. The method of claim 2, wherein removing at least a portion of the silica silylate from the chamber comprises drawing a vacuum to induce air flow from the chamber.

10. The method of claim 9, further comprising streaming air into the chamber, wherein the air stream causes at least a portion of the silica silylate to become airborne.

11. The method of claim 10, wherein the stream of air is directed at an angle to an axis of rotation of the chamber.

12. The method of claim 1, wherein the second period of time is about 12 to 36 hours, about 1 to 4 days, or about 5 to 10 days.

13. The method of claim 1, further comprising brushing the exterior surface of at least one of the plurality of sports balls after the second period of time to remove at least a portion of silica silylate.

14. The method of claim 1, further comprising:

loading at least a portion of the plurality of sports balls into a chamber after the second period of time;

agitated the chamber to remove at least a portion of silica silylate from the treated surface of the sports balls; and removing the sports balls from the chamber.

15. The method of claim 1, wherein at least a portion of the silica silylate in the chamber has a maximum diameter of about 1 to 100 nanometers, about 100 to 2500 nanometers, or about 1 and 1000 micrometers.

16. The method of claim 1, further comprising extracting at least a portion of silica silylate from the chamber by vacuum pressure prior to removing the sports balls from the chamber.

17. The method of claim 1, further comprising testing a treated surface of at least one of the plurality of sports balls to determine the treatment result of the at least one sports ball.

18. The method of claim 17, wherein the testing evaluates at least one of hydrophobicity, surface roughness, tackiness, color, surface gloss, or surface reflectivity.

19. A method for treating sports balls with silica silylate comprising:

loading a chamber with a plurality of sports balls;

loading the chamber with silica silylate;

agitating the chamber for a first period of time to apply silica silylate to an exterior surface of the sports balls;

agitating the chamber for a second period of time while applying a vacuum to the chamber to remove at least a portion of silica silylate from the chamber; and removing the sports balls from the chamber.

20. A method for treating sports balls with silica silylate comprising:

loading a first chamber with a plurality of sports balls;

loading the first chamber with silica silylate;

agitating the first chamber to apply silica silylate to an exterior surface of the sports balls;

removing the sports balls from the first chamber;

resting the sports balls for about 1 to 10 days;

loading a second chamber with the sports balls;

agitating the second chamber to remove at least a portion of silica silylate from the exterior surface of the sports balls;

removing the sports balls from the second chamber; and testing the exterior surface of at least one of the sports balls to determine the treatment results of the plurality of sports balls.

* * * * *